(12) United States Patent
Yajima et al.

(10) Patent No.: US 9,906,020 B2
(45) Date of Patent: Feb. 27, 2018

(54) ELECTRIC POWER GENERATION CONTROL SYSTEM, ELECTRIC POWER GENERATION CONTROL PROGRAM, AND ELECTRONIC APPARATUS

(71) Applicant: Sony Corporation, Tokyo (JP)

(72) Inventors: Masakazu Yajima, Kanagawa (JP); Tomoharu Mukasa, Saitama (JP)

(73) Assignee: Sony Corporation, Tokyo (JP)

( * ) Notice: Subject to any disclaimer, the term of this patent is extended or adjusted under 35 U.S.C. 154(b) by 952 days.

(21) Appl. No.: 14/352,718

(22) PCT Filed: Oct. 23, 2012

(86) PCT No.: PCT/JP2012/077310
§ 371 (c)(1),
(2) Date: Apr. 18, 2014

(87) PCT Pub. No.: WO2013/065519
PCT Pub. Date: May 10, 2013

(65) Prior Publication Data
US 2014/0252884 A1    Sep. 11, 2014

(30) Foreign Application Priority Data

Oct. 31, 2011    (JP) .................................. 2011-238214

(51) Int. Cl.
*H02J 1/00*      (2006.01)
*H02J 7/00*      (2006.01)
(Continued)

(52) U.S. Cl.
CPC ............... *H02J 1/00* (2013.01); *H01M 10/44* (2013.01); *H01M 10/465* (2013.01); *H02J 3/14* (2013.01);
(Continued)

(58) Field of Classification Search
CPC ............... H02J 1/00; H02J 7/14; H01M 10/44
See application file for complete search history.

(56) References Cited

U.S. PATENT DOCUMENTS

2010/0033125 A1    2/2010  Yamada
2010/0138363 A1*   6/2010  Batterberry ............ G06Q 10/04
                                                705/412

FOREIGN PATENT DOCUMENTS

JP    2001-346336 A    12/2001
JP    2002-359676 A    12/2002
(Continued)

*Primary Examiner* — Jeffrey Shin
(74) *Attorney, Agent, or Firm* — Wolf, Greenfield & Sacks, P.C.

(57) ABSTRACT

An electric power generation control system includes: a variation prediction section configured to predict future variation, based on a variation log including a plurality of variation patterns obtained from past physical quantities and a variation pattern obtained from a newly obtained physical quantity; a balance calculation section configured to calculate energy balance between a electric power generation amount and a discharge amount with use of variation prediction in the variation prediction section; and a switching timing calculation section configured to calculate a timing of switching between various modes relating to electric power generation and discharge with use of the energy balance calculated by the balance calculation section.

16 Claims, 37 Drawing Sheets

(51) Int. Cl.

| | |
|---|---|
| *H02J 7/04* | (2006.01) |
| *H02J 7/14* | (2006.01) |
| *H02J 7/34* | (2006.01) |
| *H01M 10/44* | (2006.01) |
| *H01M 10/46* | (2006.01) |
| *H02J 3/14* | (2006.01) |
| *H02J 3/28* | (2006.01) |
| *H01M 10/42* | (2006.01) |
| *H02J 3/38* | (2006.01) |
| *H02J 3/00* | (2006.01) |

(52) U.S. Cl.
CPC ................ *H02J 3/28* (2013.01); *H02J 7/007* (2013.01); *H02J 7/04* (2013.01); *H02J 7/1469* (2013.01); *H02J 7/34* (2013.01); *H01M 10/42* (2013.01); *H01M 10/448* (2013.01); *H01M 2220/30* (2013.01); *H02J 3/385* (2013.01); *H02J 2003/003* (2013.01); *Y02E 10/58* (2013.01); *Y02E 70/30* (2013.01); *Y04S 10/54* (2013.01); *Y10T 307/832* (2015.04)

(56) References Cited

FOREIGN PATENT DOCUMENTS

| | | |
|---|---|---|
| JP | 2003-209994 A | 7/2003 |
| JP | 2011-166884 A | 8/2011 |
| JP | 2012-115115 A | 6/2012 |
| WO | WO 2008/053809 A1 | 5/2008 |
| WO | WO 2010/027346 A1 | 3/2010 |

* cited by examiner

[ FIG. 1 ]
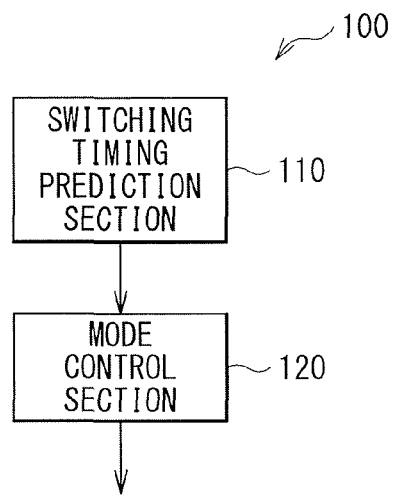
[ FIG. 2 ]
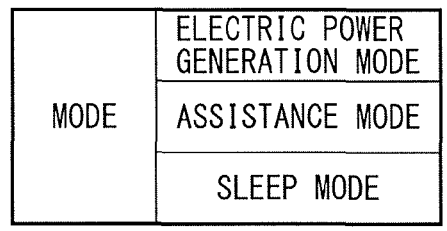
[ FIG. 3A ]
| ASSISTANCE MODE (MODE A) | ENERGY IS SUPPLIED FROM ELECTRIC POWER STORAGE SYSTEM TO ELECTRIC POWER GENERATION SYSTEM |
|---|---|
[ FIG. 3B ]
| ASSISTANCE MODE (MODE B) | MUSIC INDUCING INCREASE IN ELECTRIC POWER GENERATION AMOUNT IS REPRODUCED |
|---|---|

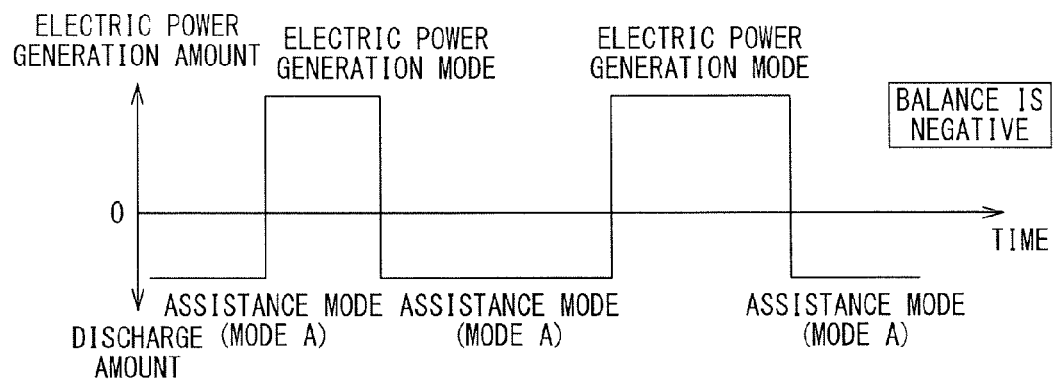
[ FIG. 4A ]
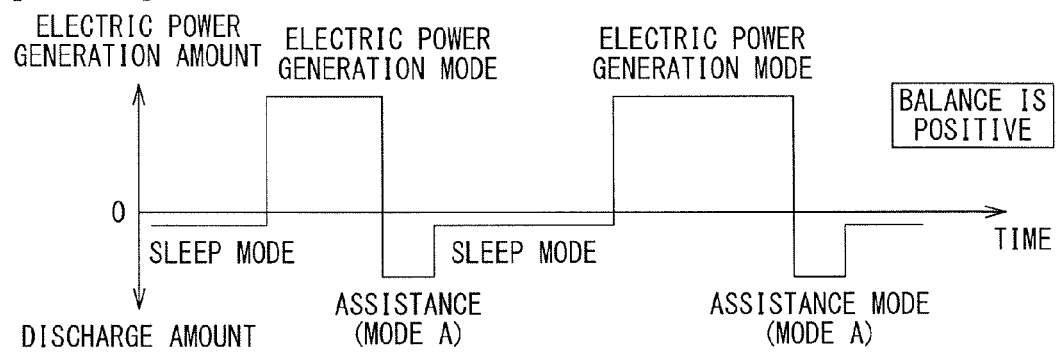
[ FIG. 4B ]
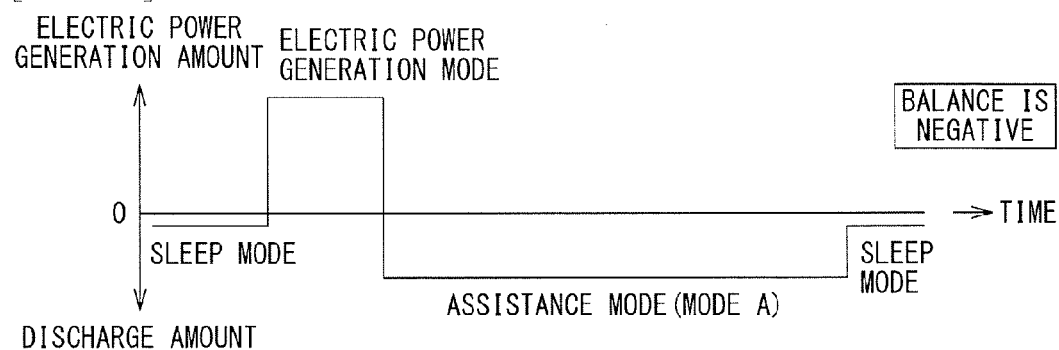
[ FIG. 5A ]
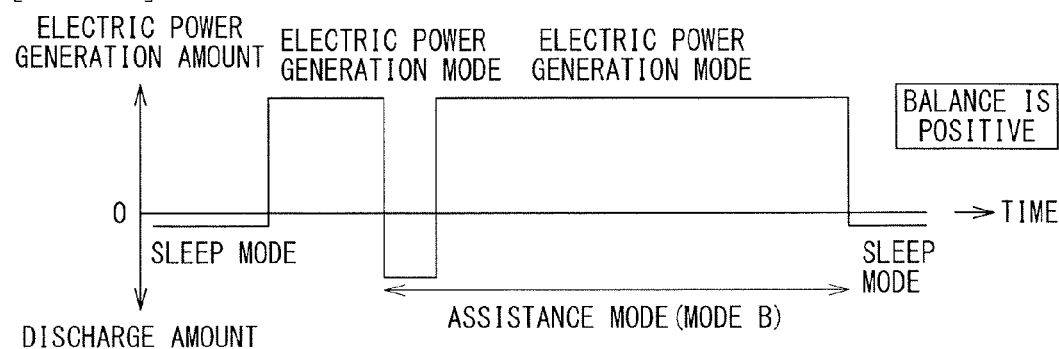
[ FIG. 5B ]

[ FIG. 6 ]

| MODE | ELECTRIC POWER GENERATION MODE |
| --- | --- |
| | TUNING MODE |
| | SLEEP MODE |

[ FIG. 7A ]

| TUNING MODE | CIRCUIT CONSTANT IS TUNED TO HAVE RESONANT FREQUENCY CORRESPONDING TO VIBRATION FREQUENCY OF ELECTRIC POWER GENERATION SYSTEM |
| --- | --- |

[ FIG. 7B ]

| TUNING MODE | ORIENTATION OF ELECTRIC POWER GENERATION SYSTEM IS ADJUSTED TO DIRECTION CORRESPONDING TO VIBRATIOIN DIRECTION |
| --- | --- |

[ FIG. 7C ]

| TUNING MODE | ORIENTATION OF ELECTRIC POWER GENERATION SYSTEM IS ADJUSTED TO DIRECTION CORRESPODING TO INCIDENT DIRECTION OF LIGHT OR ELECTROMAGNETIC WAVE |
| --- | --- |

[ FIG. 7D ]

| TUNING MODE | CIRCUIT CONSTANT IS TUNED TO HAVE RESONANT FREQUENCY CORRESPONDING TO FREQUENCY OF INCIDENT ELECTROMAGNETIC WAVE |
| --- | --- |

[ FIG. 8A ]
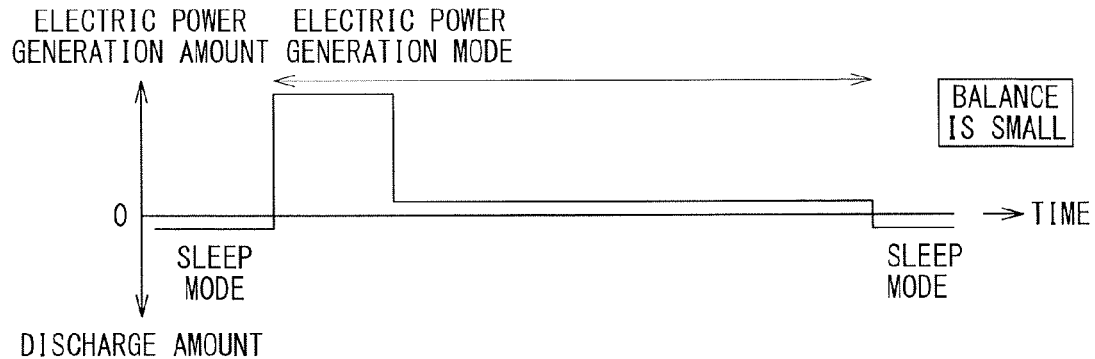
[ FIG. 8B ]
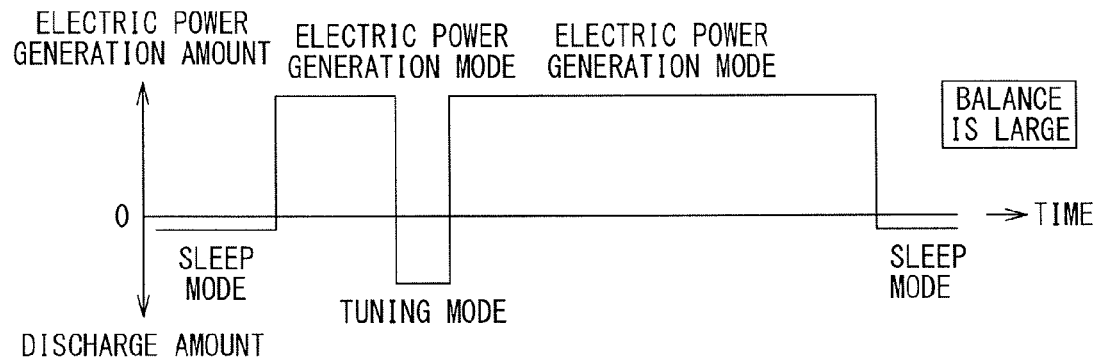
[ FIG. 9 ]
| MODE | ELECTRIC POWER GENERATION MODE |
| --- | --- |
| | ASSISTANCE MODE |
| | TUNING MODE |
| | SLEEP MODE |

[ FIG. 10 ]

| MODE | ELECTRIC POWER GENERATION MODE | NORMAL MODE |
| --- | --- | --- |
| | | TUNING MODE |
| | ASSISTANCE MODE | NORMAL MODE |
| | | TUNING MODE |
| | SLEEP MODE | |

[ FIG. 11 ]

| MODE | ELECTRIC POWER GENERATION MODE | NORMAL MODE |
| --- | --- | --- |
| | | TUNING MODE |
| | ASSISTANCE MODE | NORMAL MODE |
| | | TUNING MODE |
| | SLEEP MODE | NORMAL MODE |
| | | TUNING MODE |

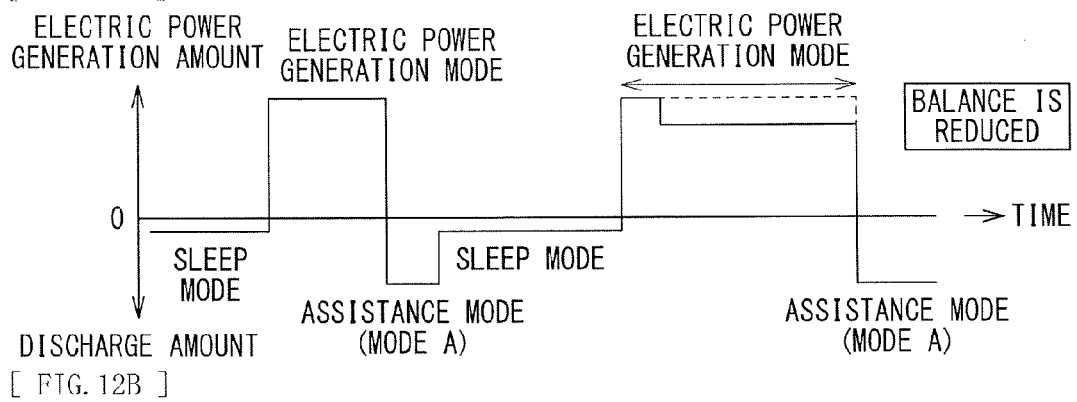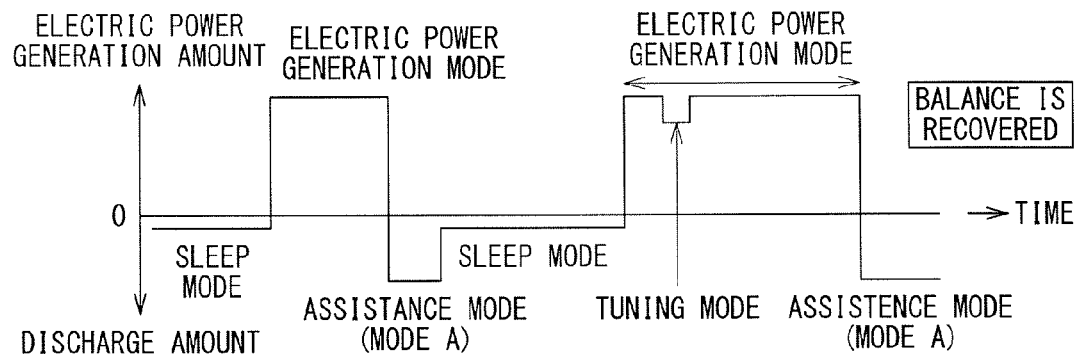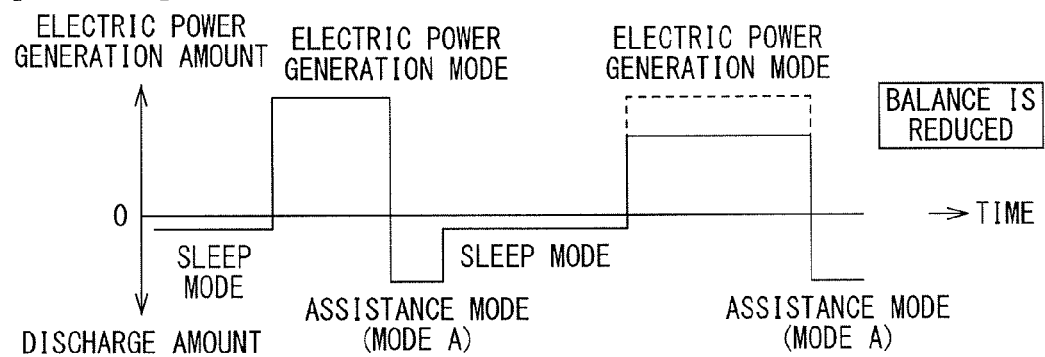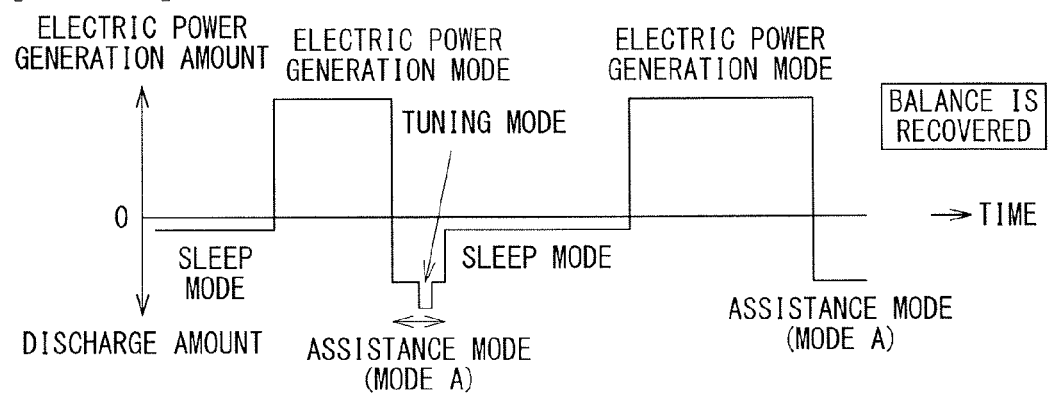

[ FIG. 14A ]
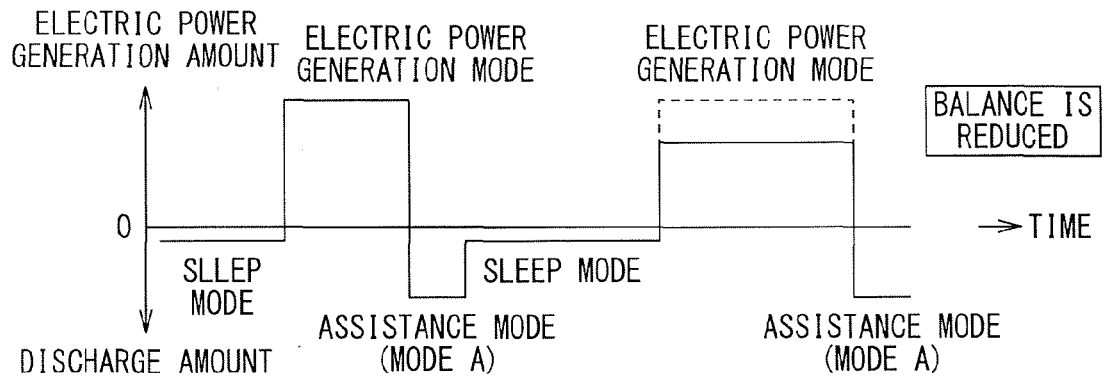
[ FIG. 14B ]
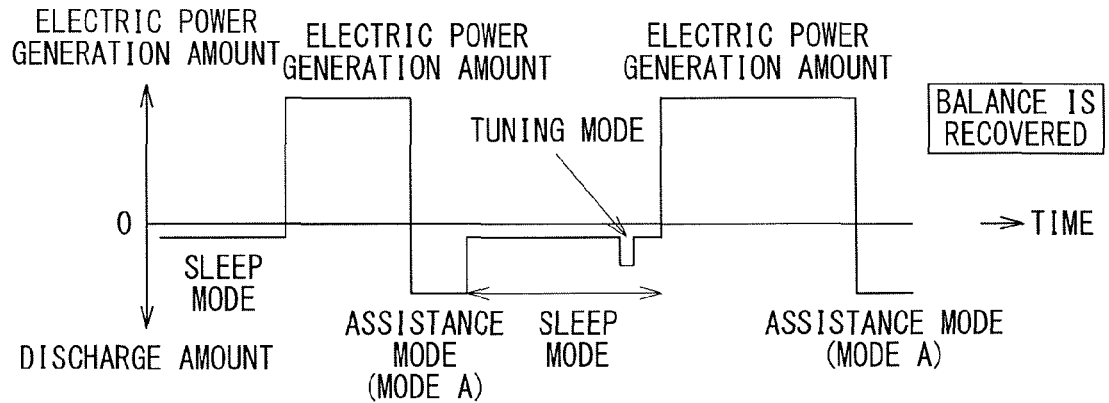
[ FIG. 15 ]
| MODE | ELECTRIC POWER GENERATION MODE | NORMAL MODE |
|---|---|---|
| | | TUNING MODE |
| | SLEEP MODE | |
[ FIG. 16 ]
| MODE | ELECTRIC POWER GENERATION MODE | NORMAL MODE |
|---|---|---|
| | | TUNING MODE |
| | SLEEP MODE | NORMAL MODE |
| | | TUNING MODE |

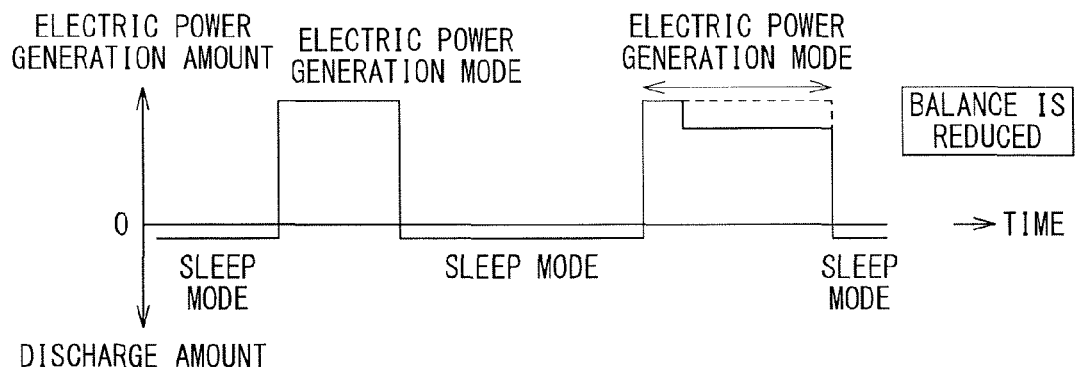
[ FIG. 17A ]
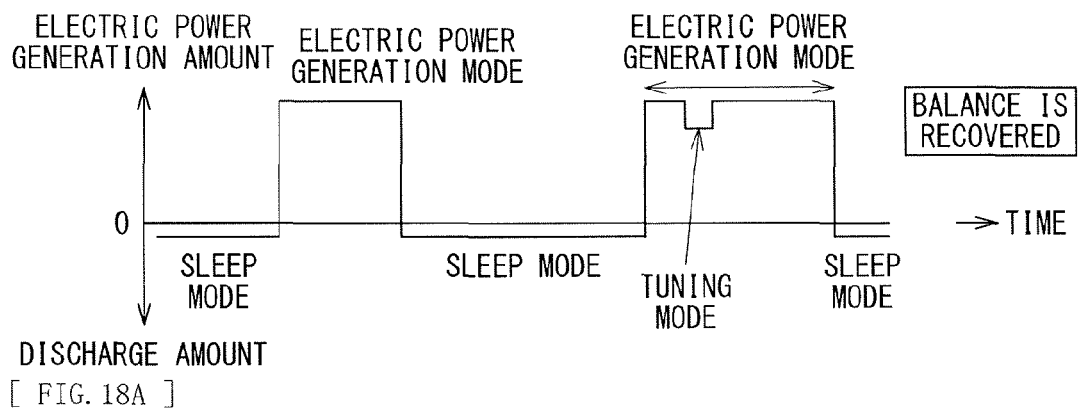
[ FIG. 17B ]
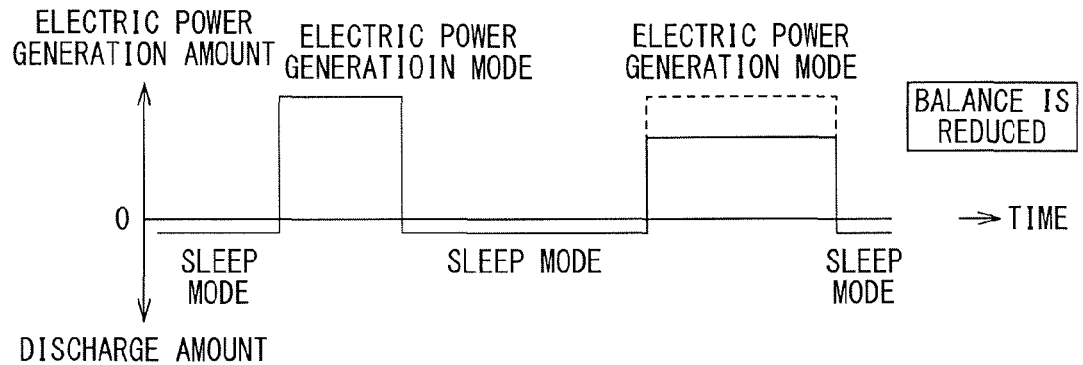
[ FIG. 18A ]
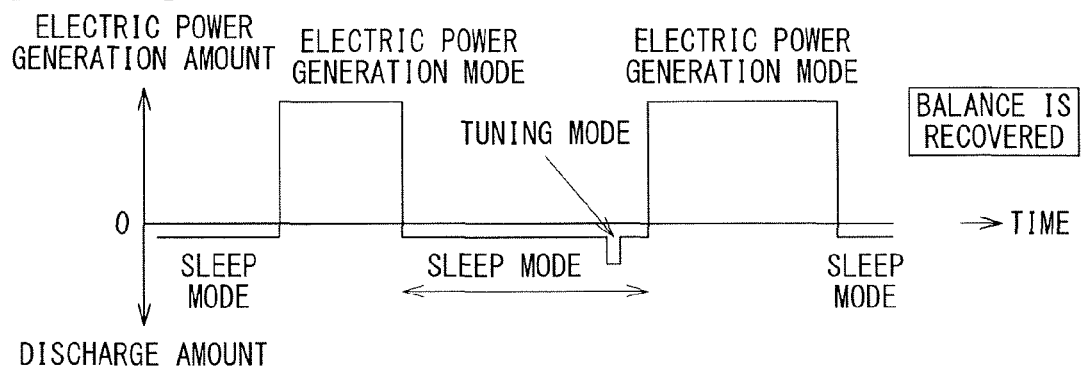
[ FIG. 18B ]

[ FIG. 19 ]
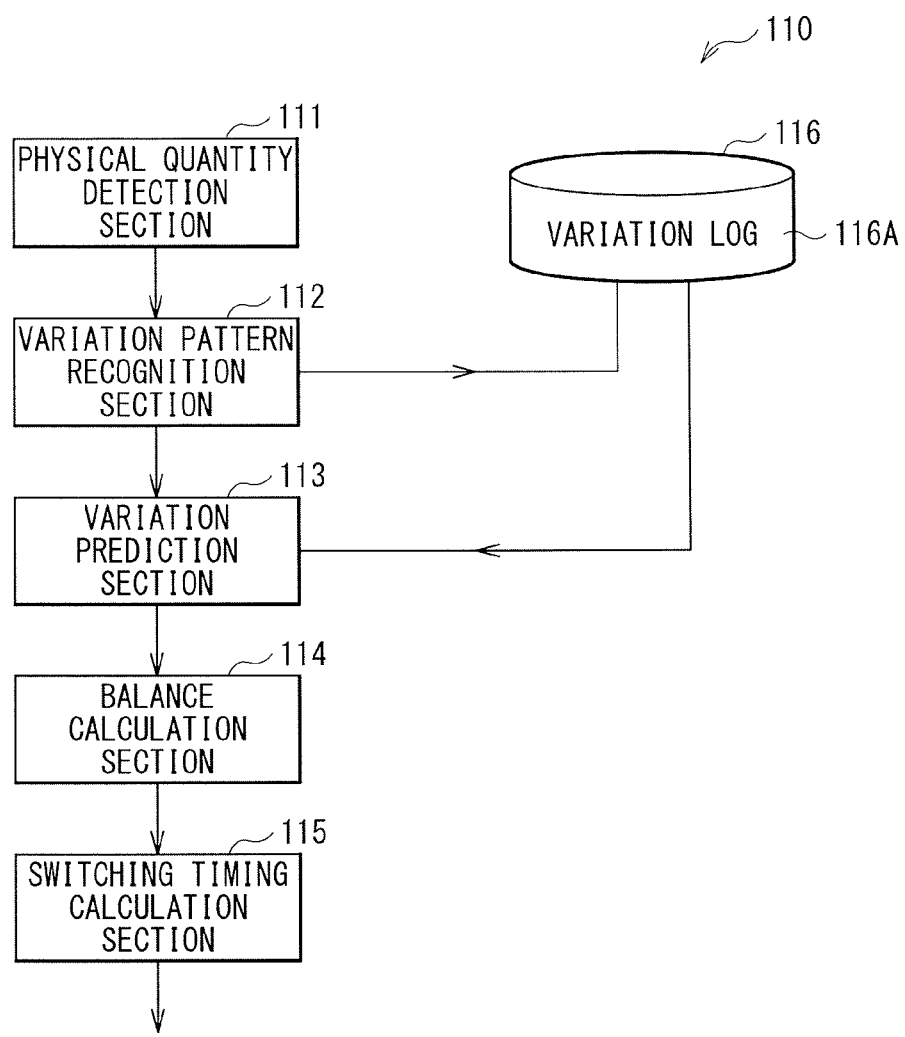

[ FIG. 20 ]
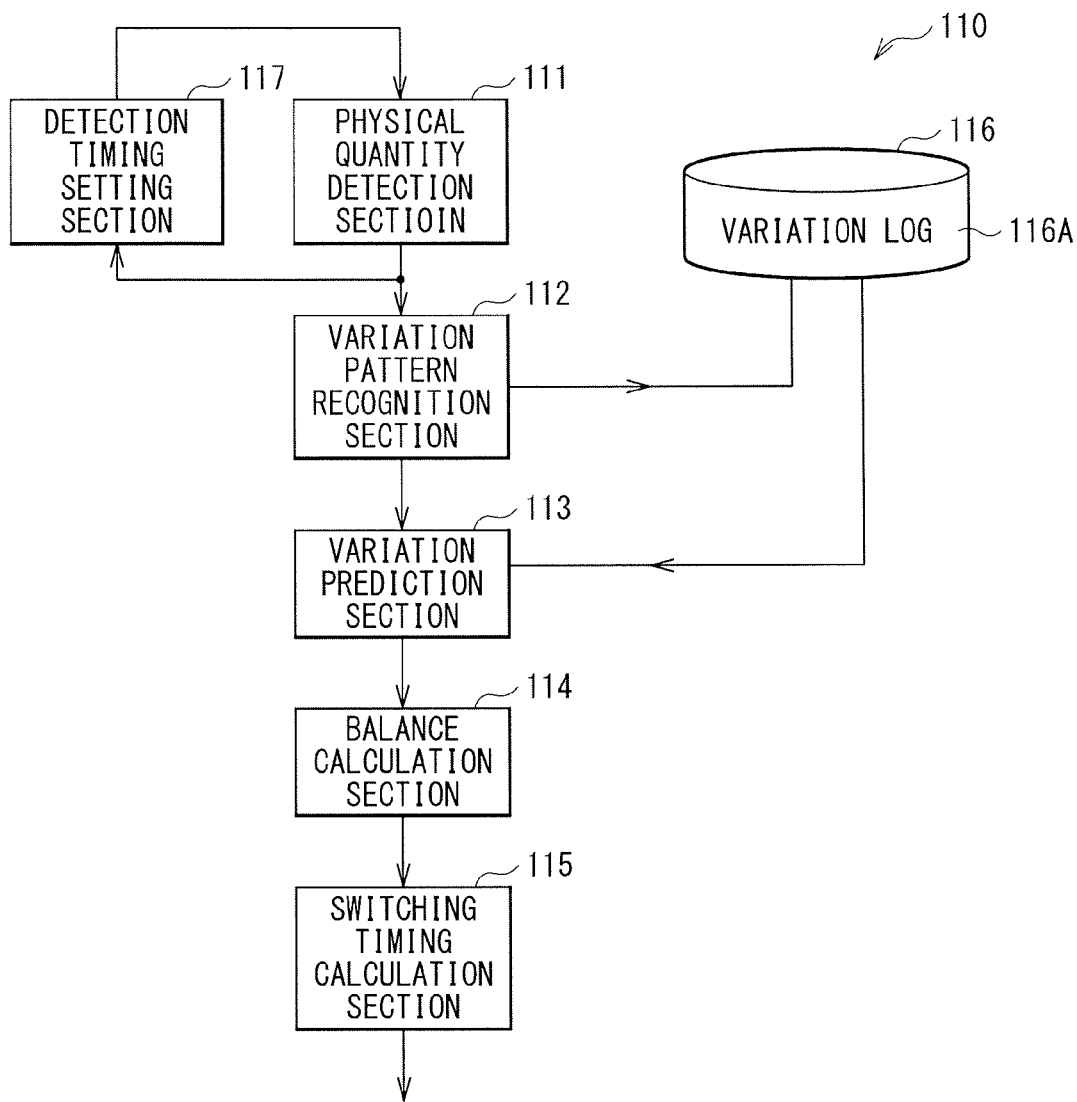

[ FIG. 21 ]
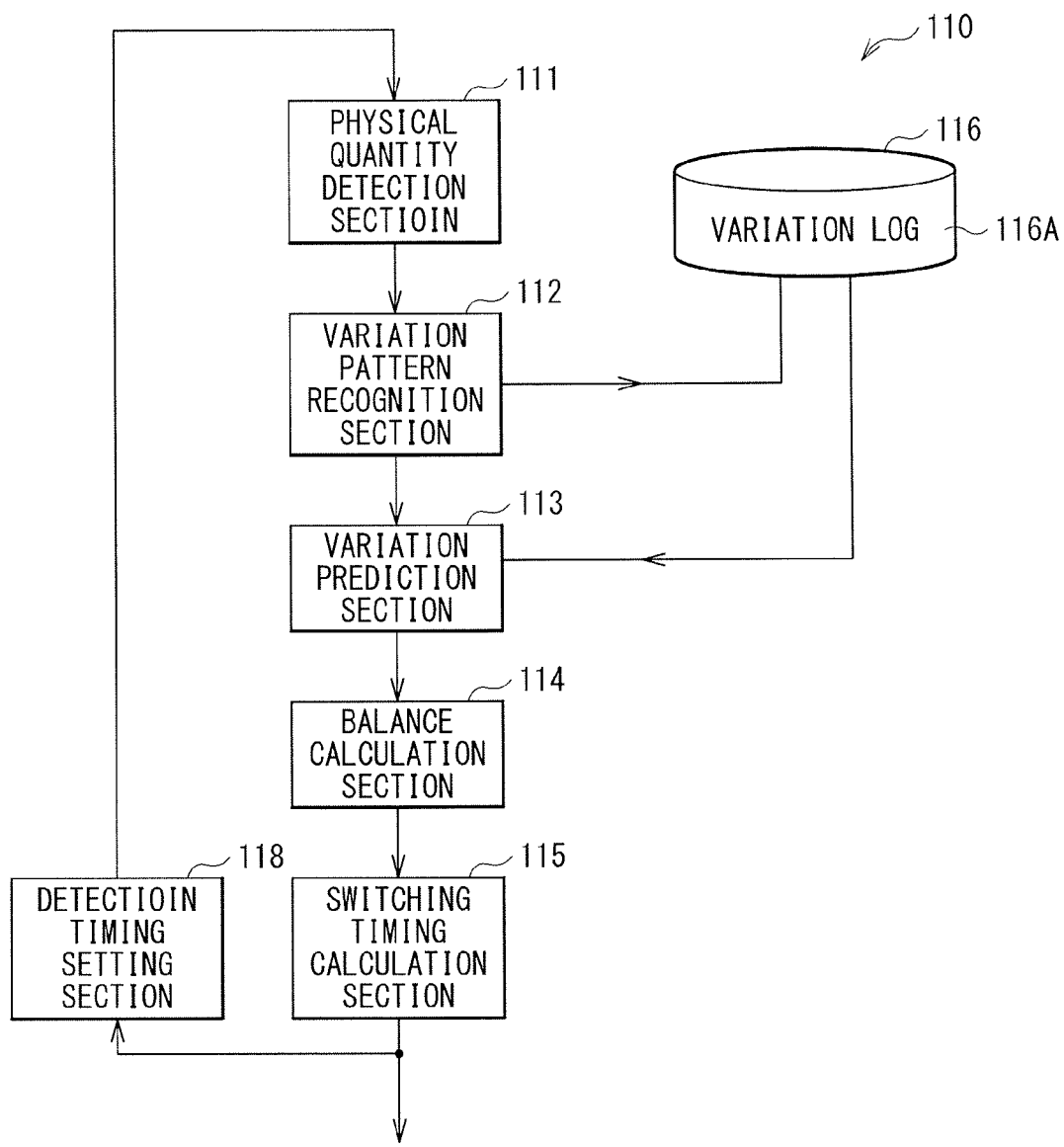

[ FIG. 22 ]
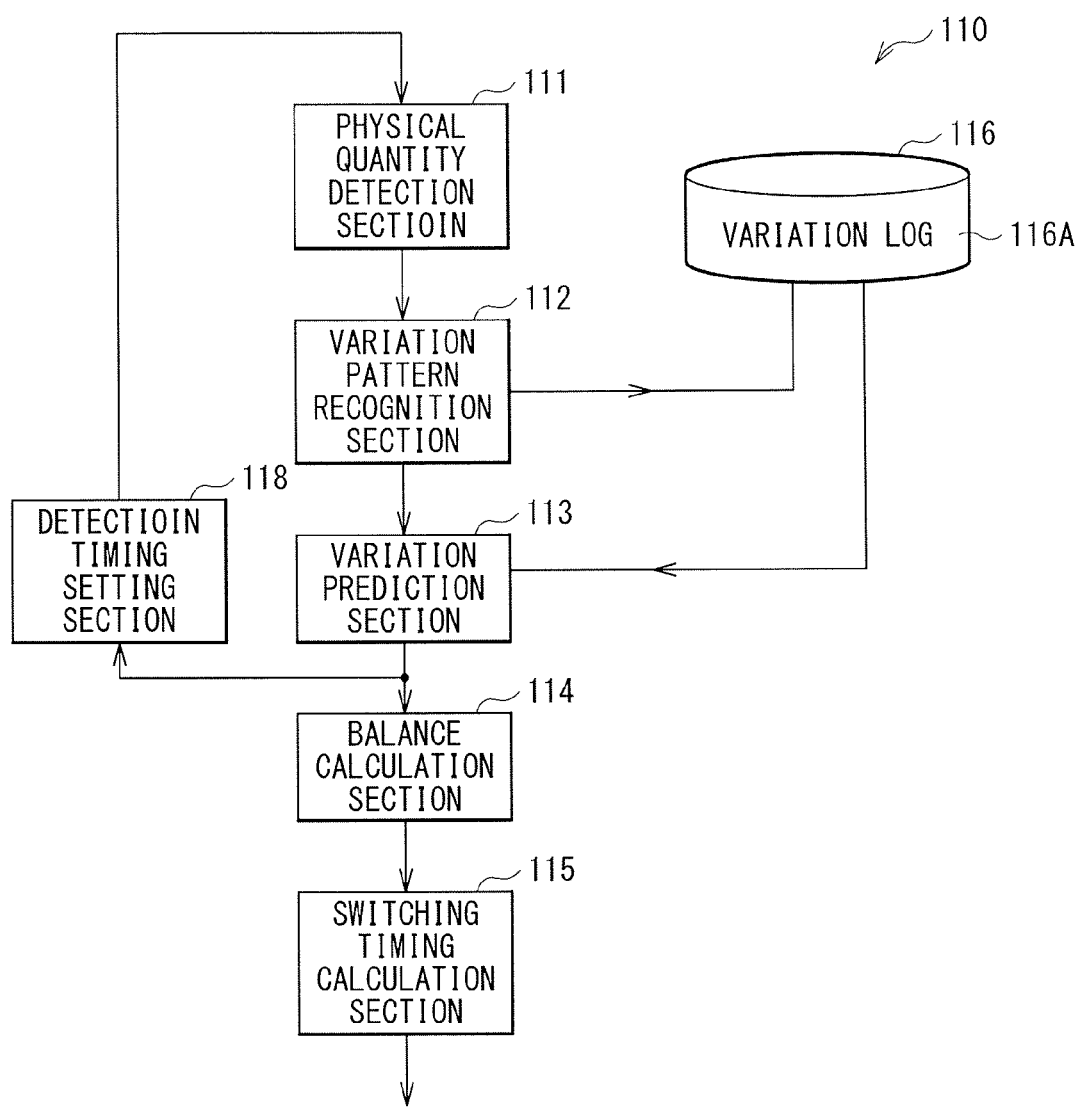

[ FIG. 23 ]
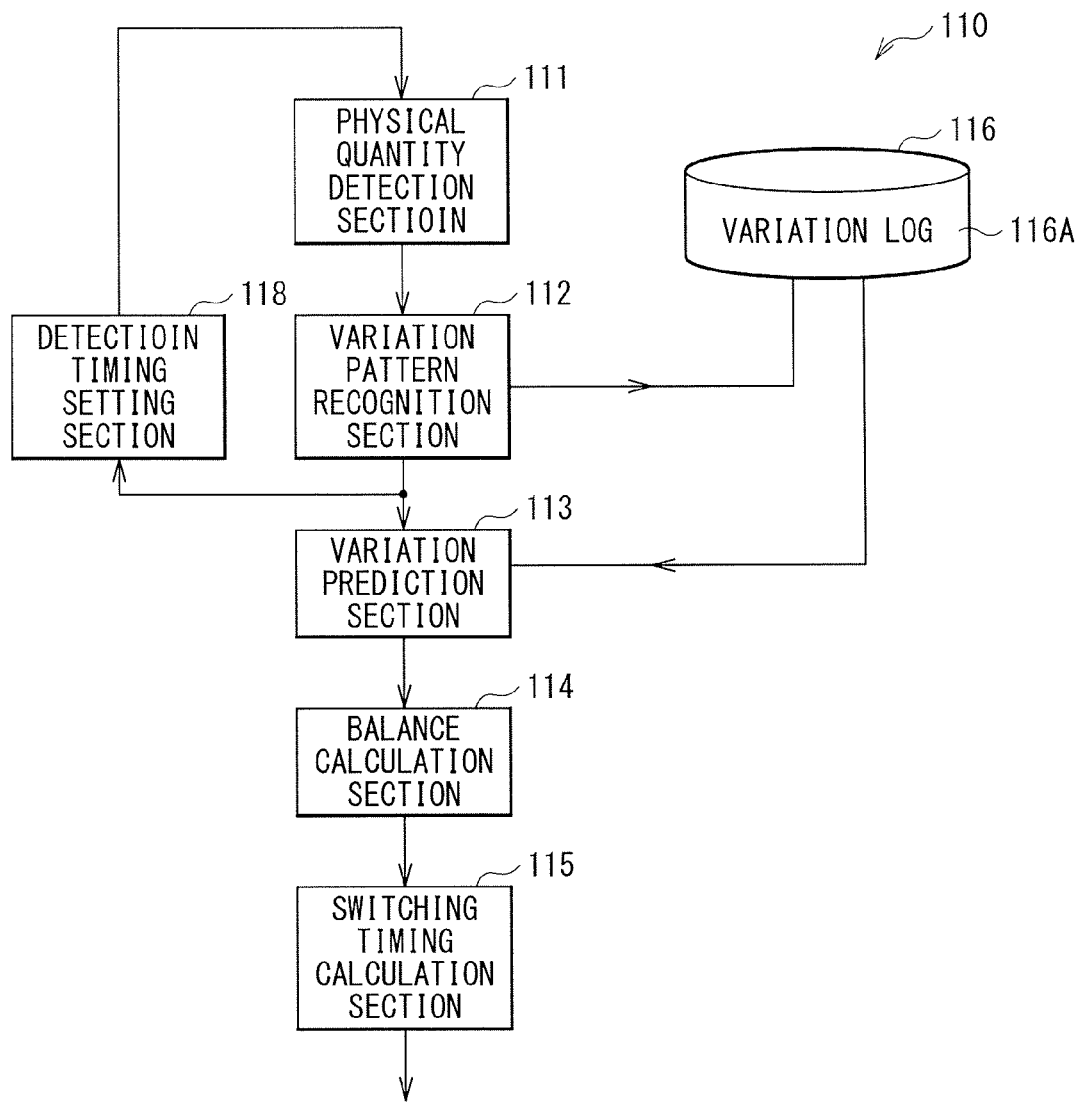

[ FIG. 24 ]
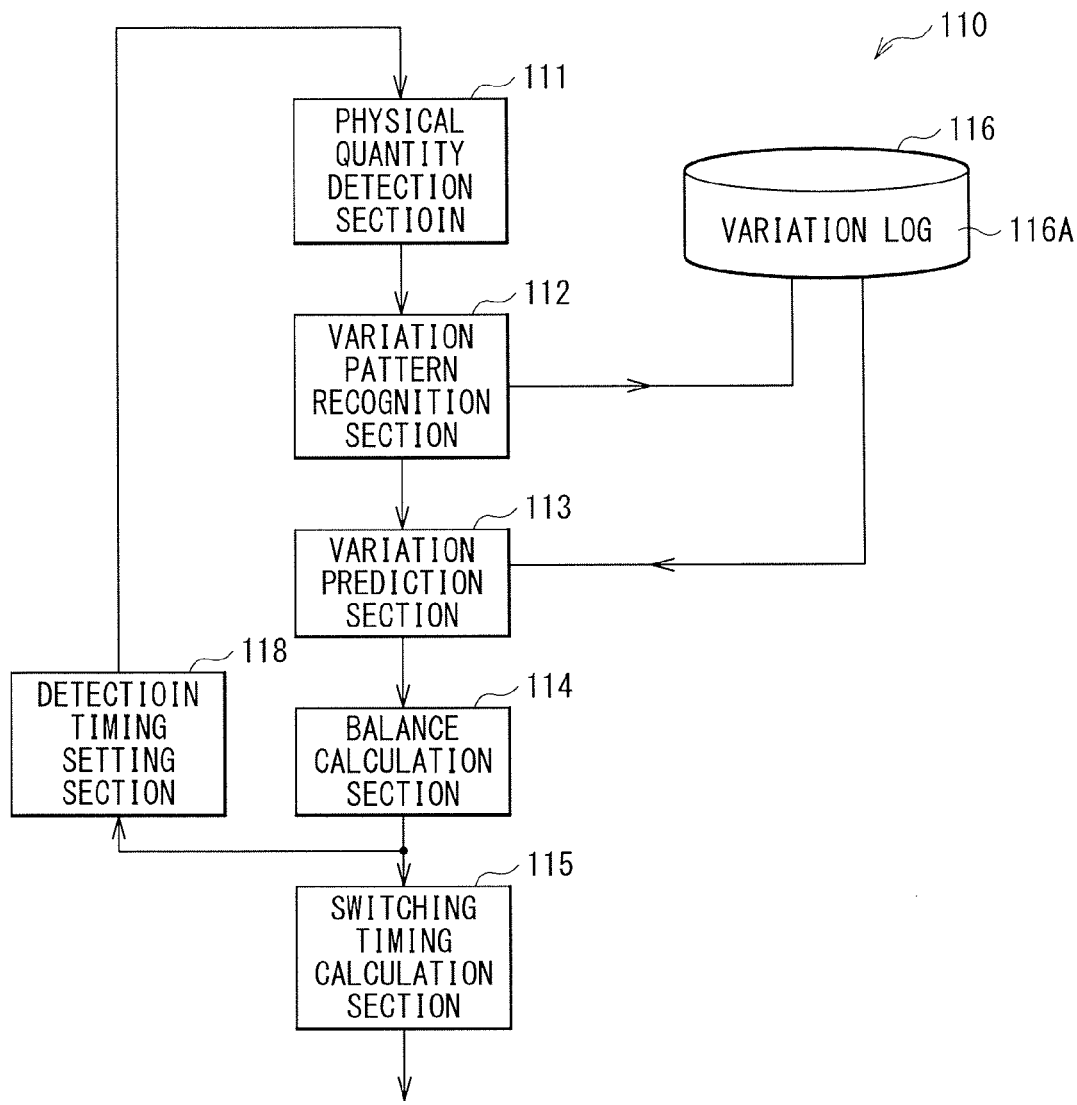

[ FIG. 25 ]
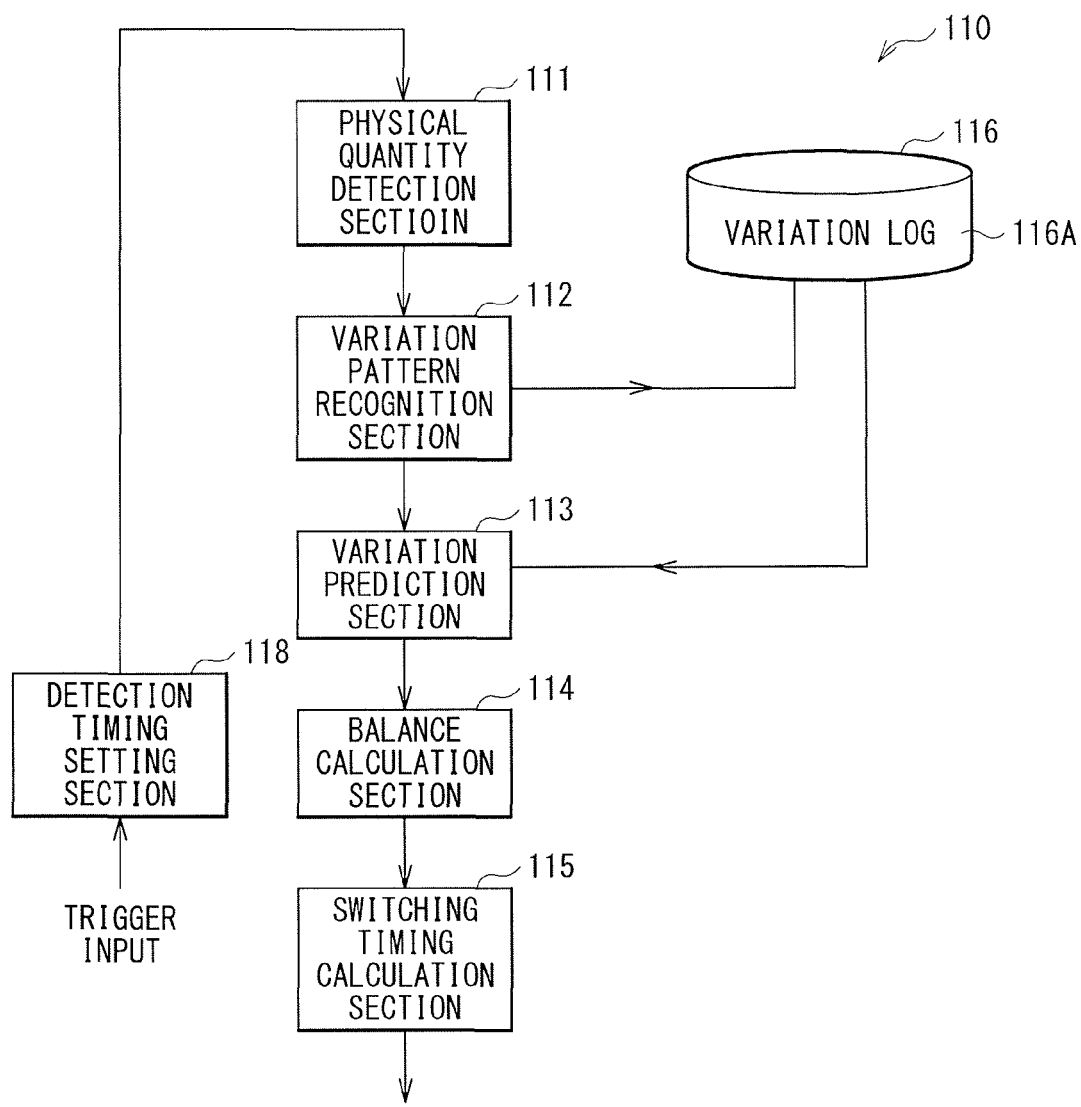

[ FIG. 26 ]
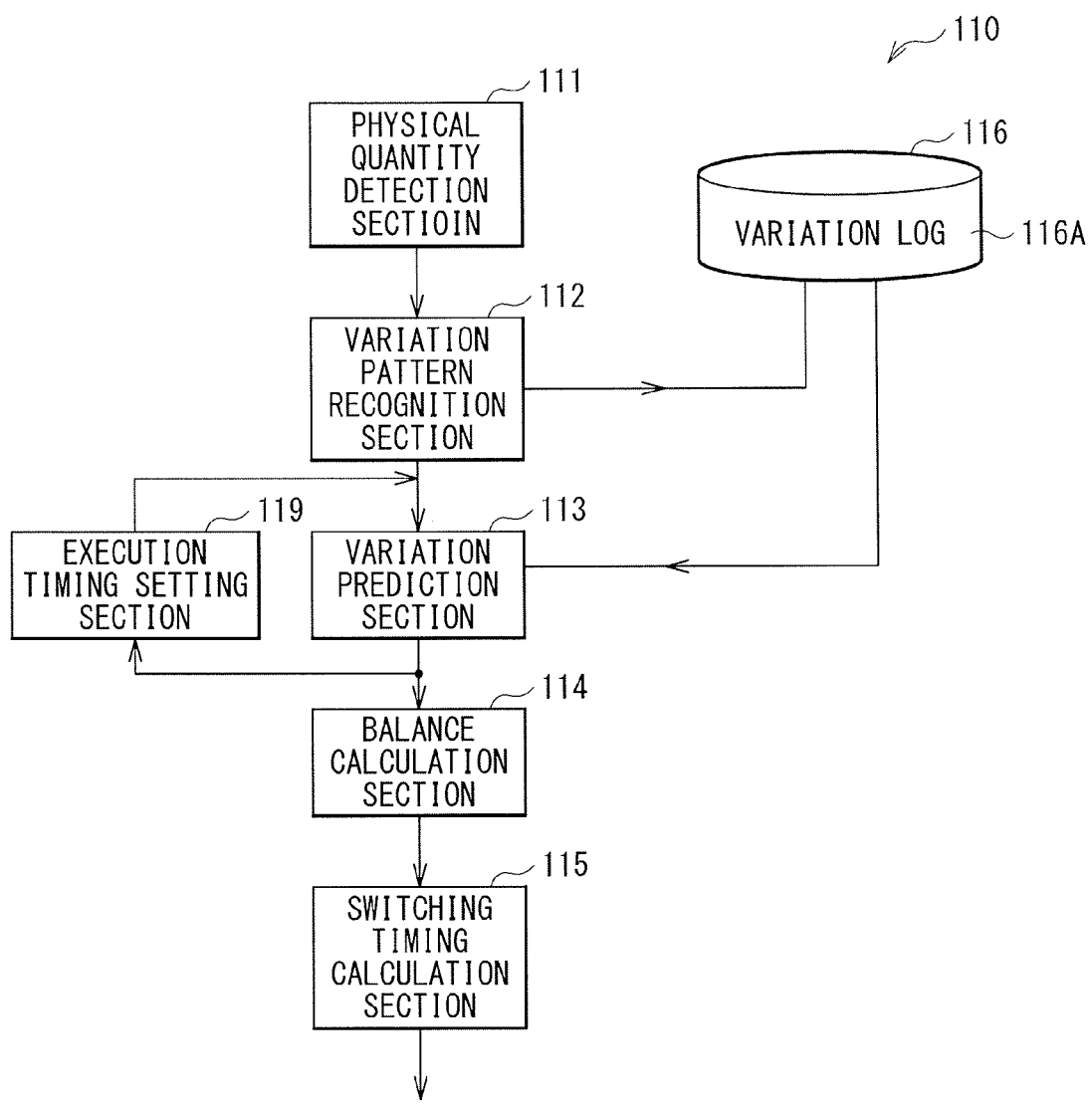

[ FIG. 27 ]
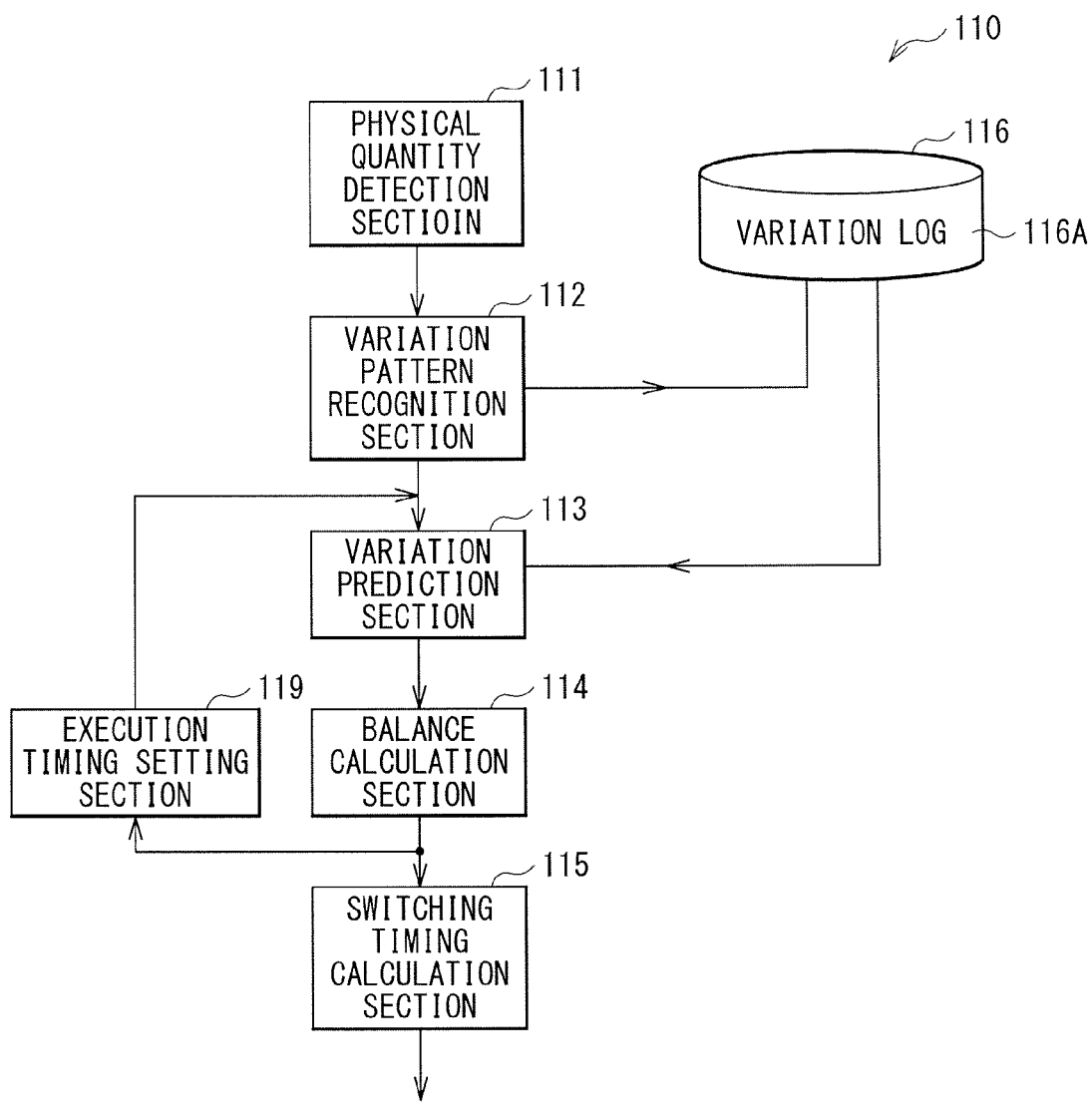

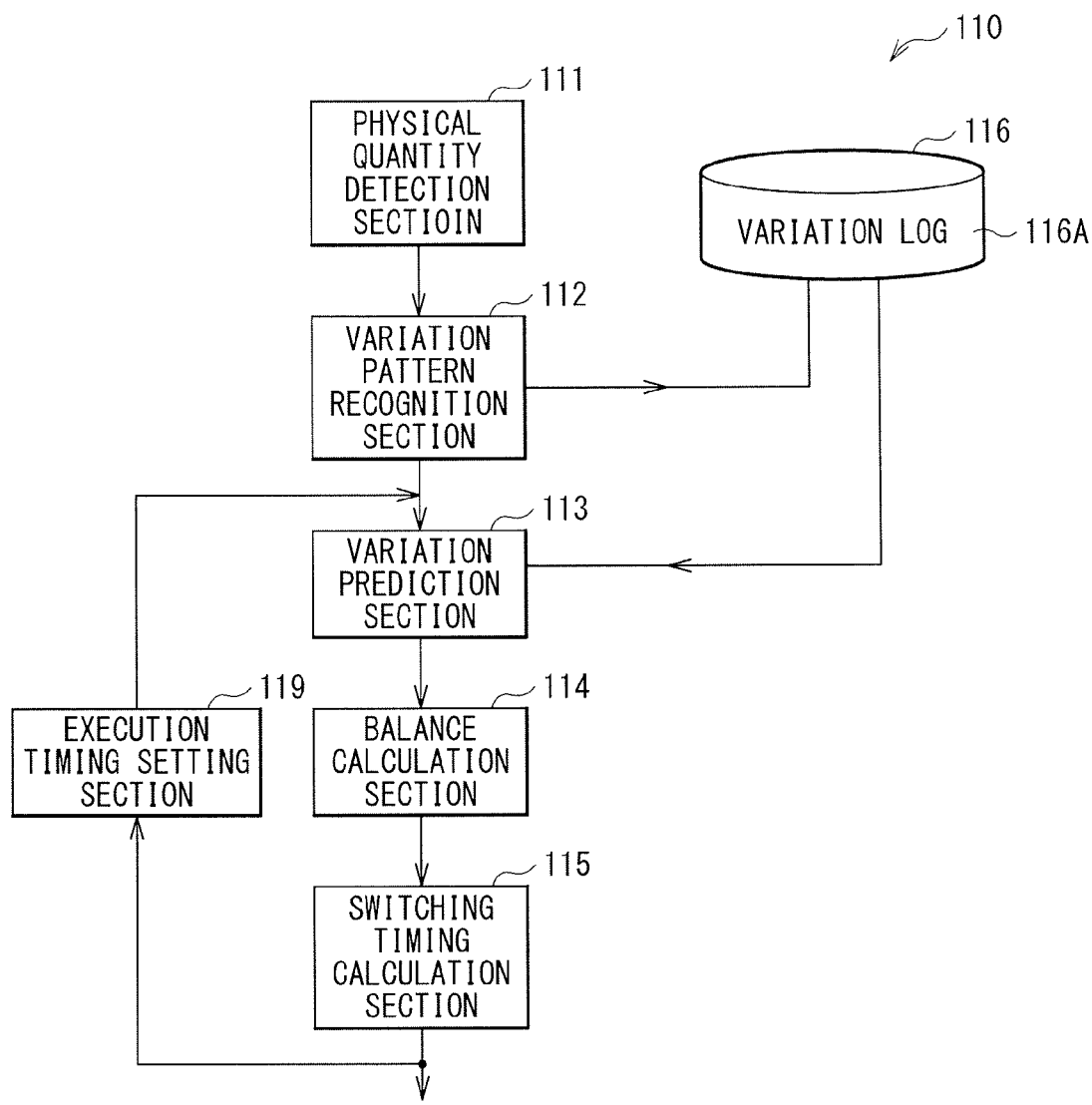
[FIG. 28]

[ FIG. 29 ]
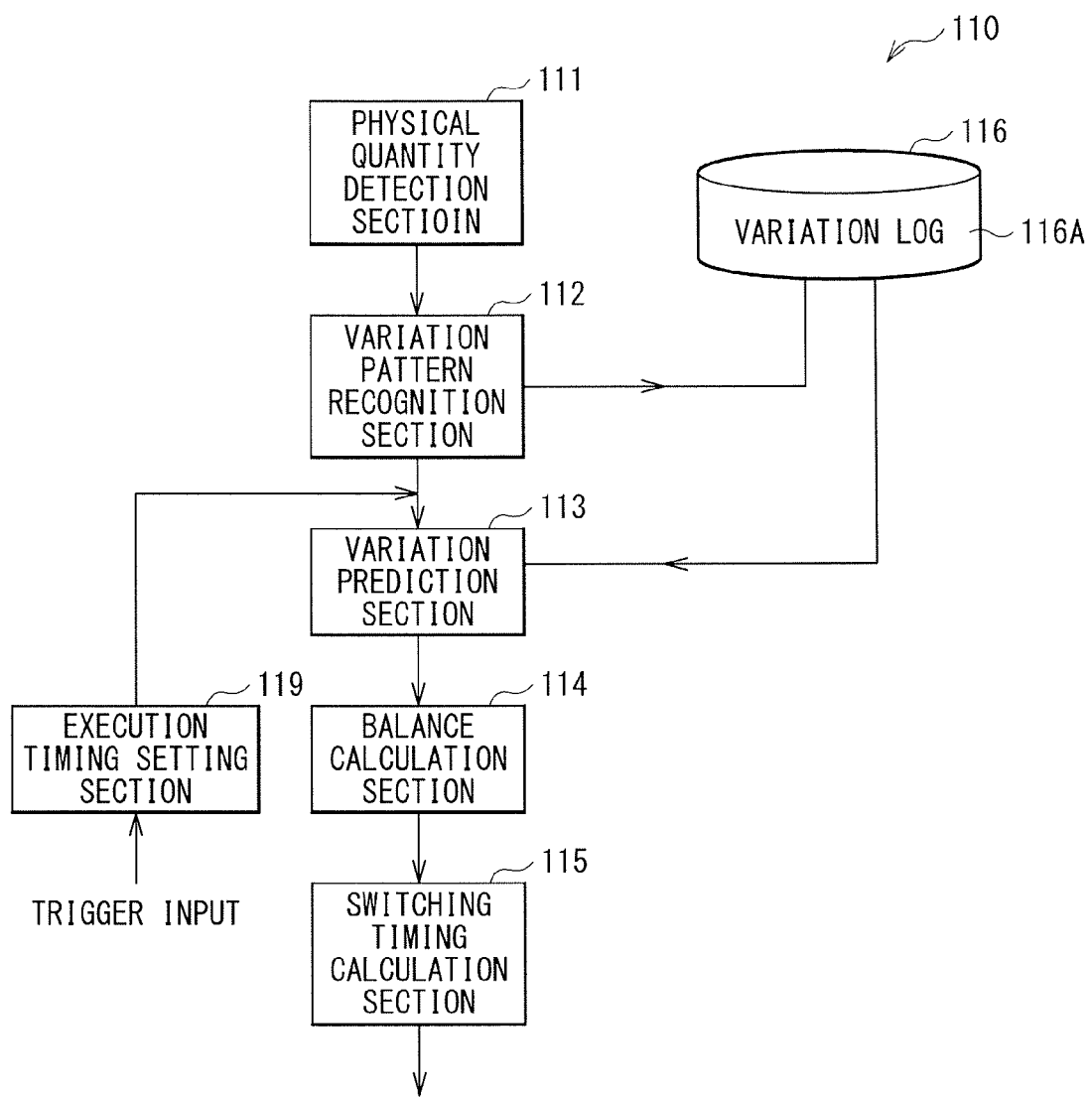

[ FIG. 30 ]
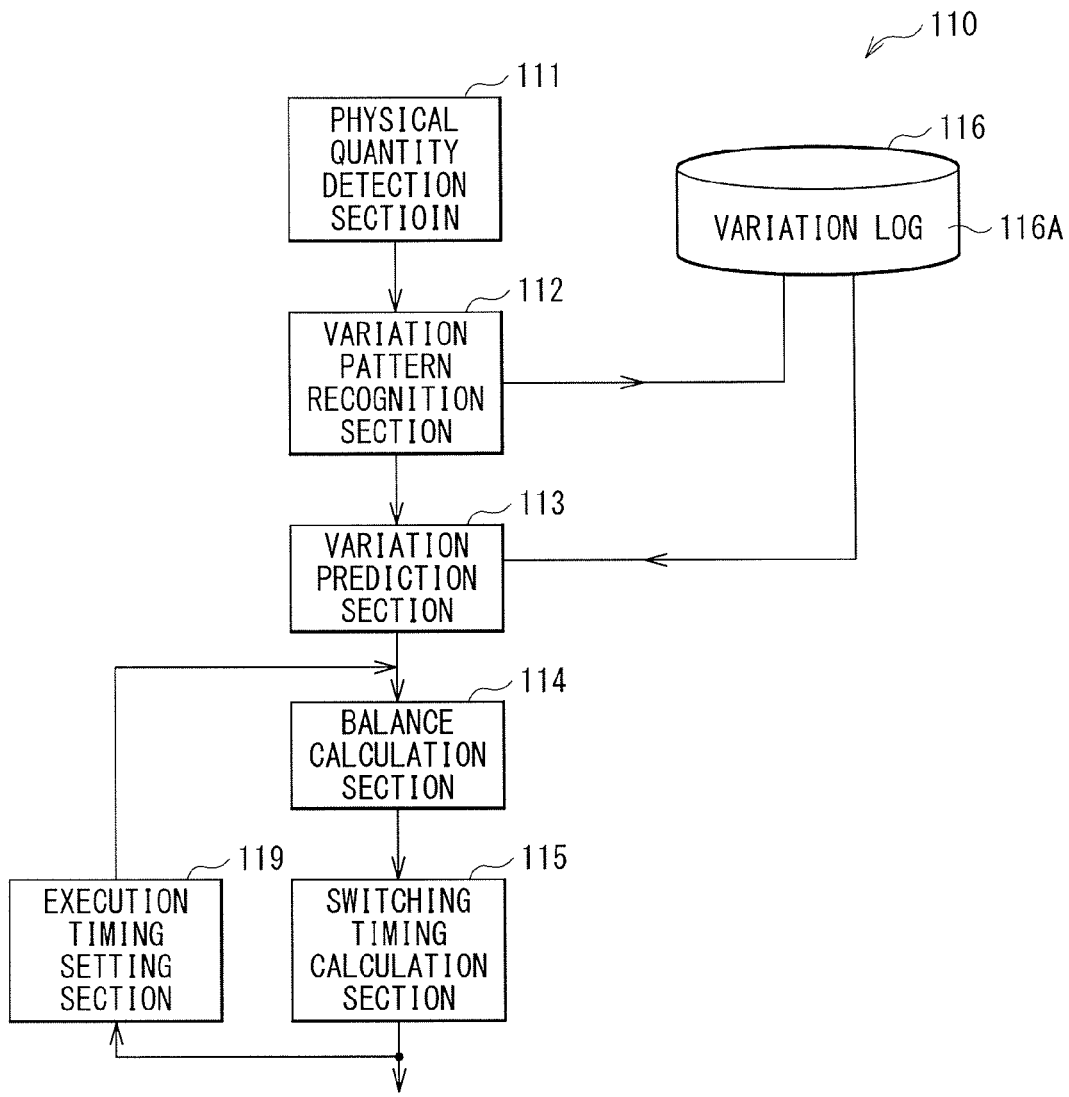

[ FIG. 31 ]
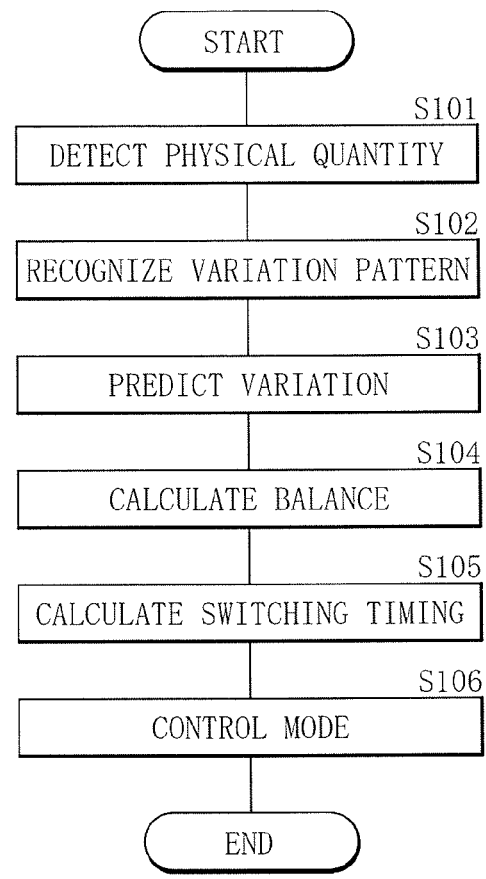

[ FIG. 32 ]
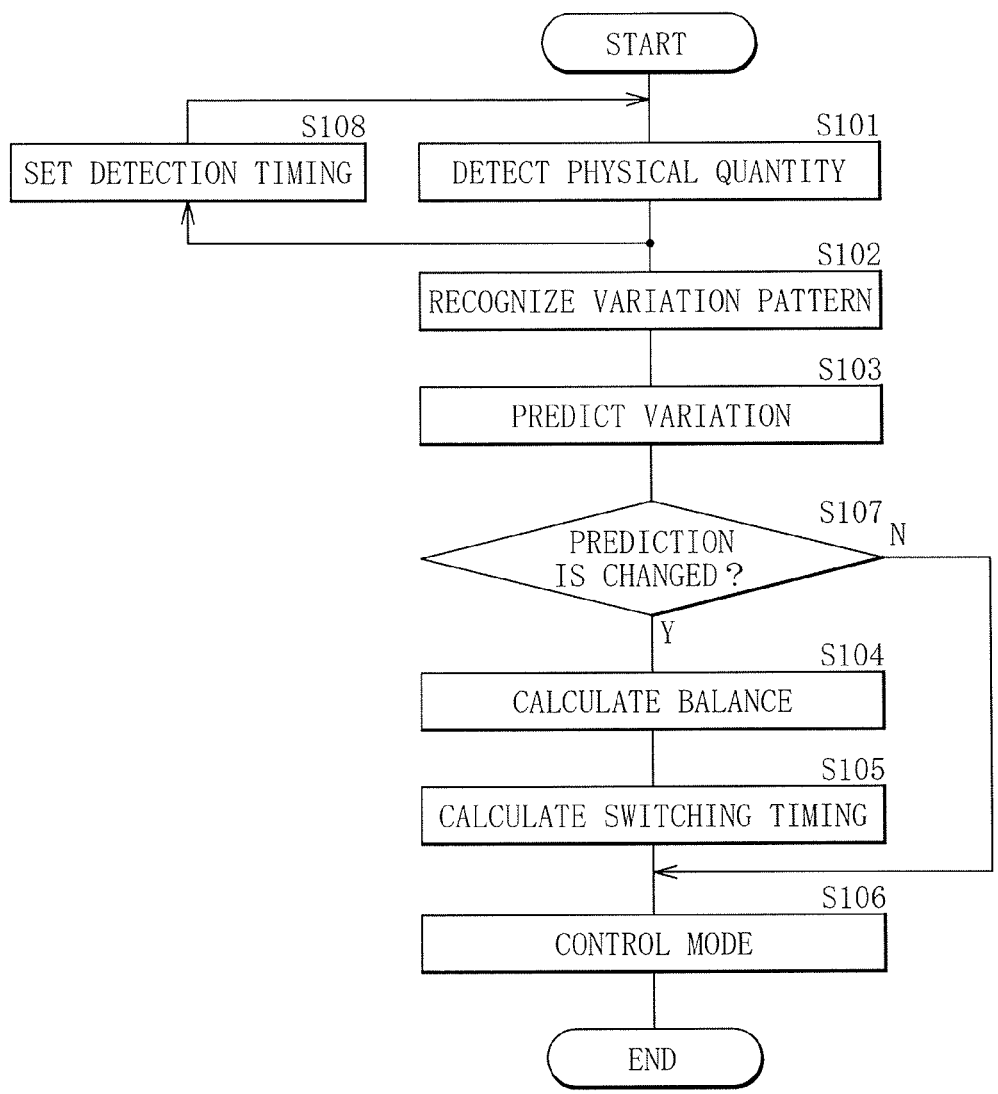

[ FIG. 33 ]
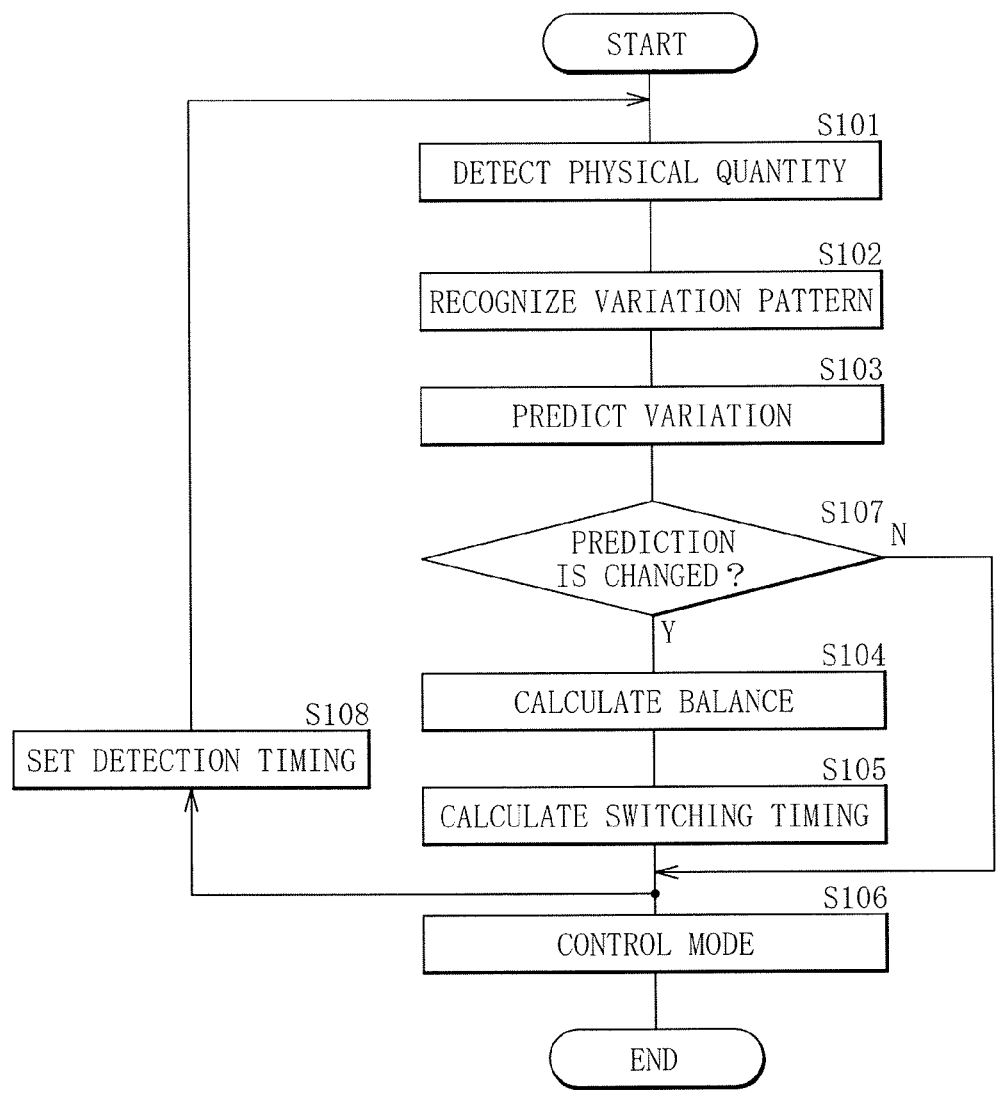

[ FIG. 34 ]
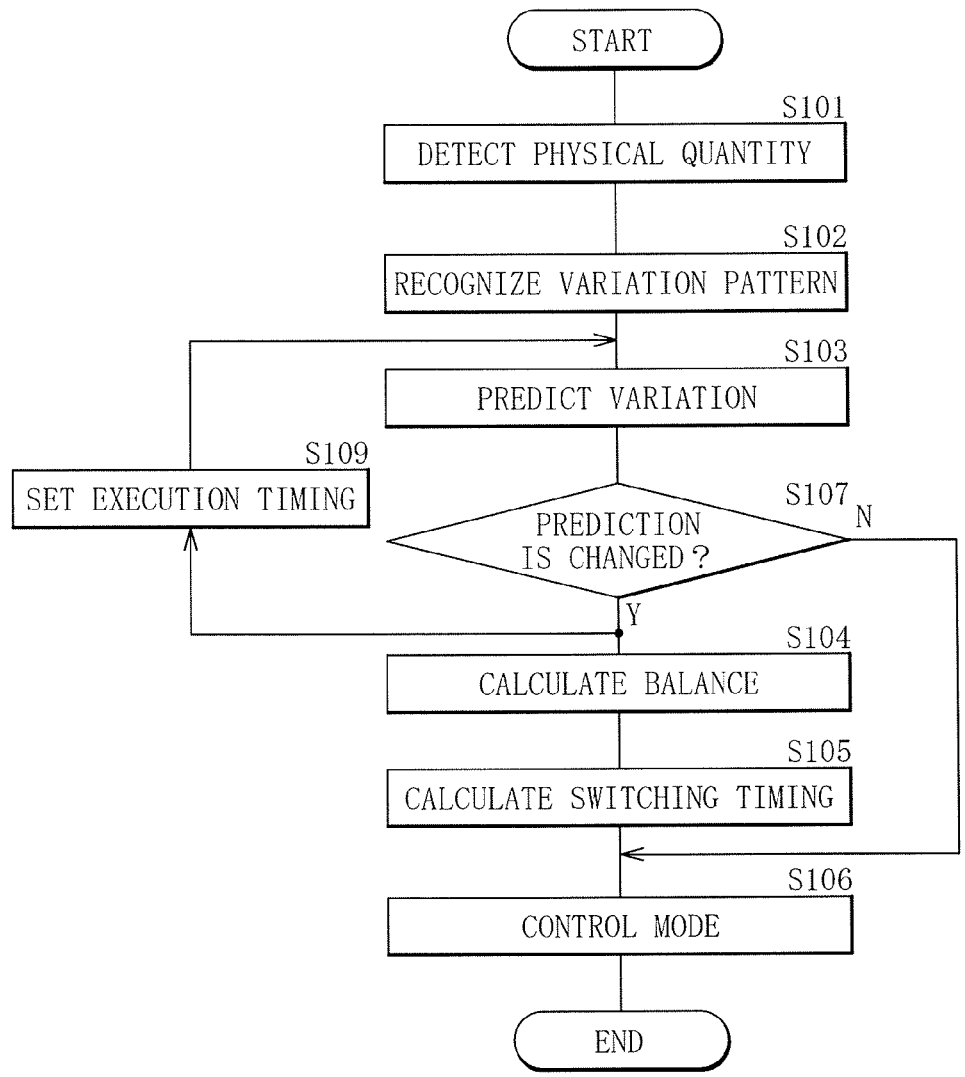

[ FIG. 35 ]
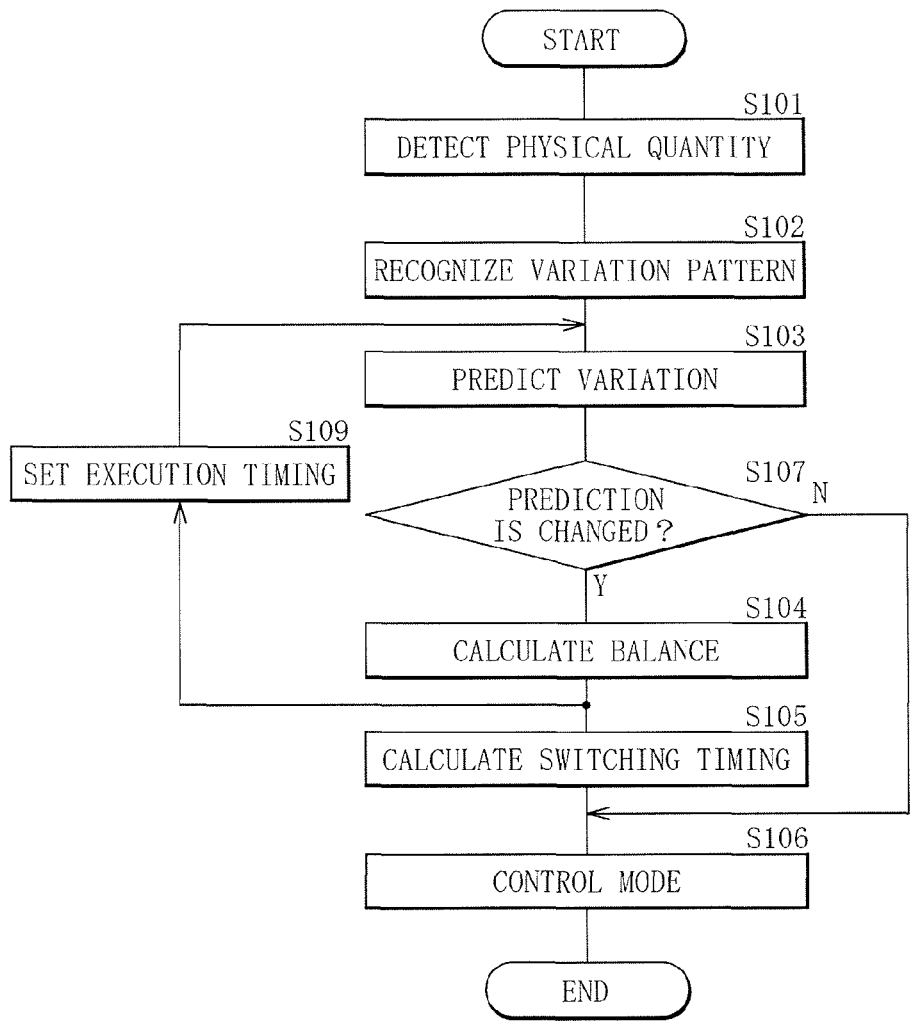
[ FIG. 36 ]
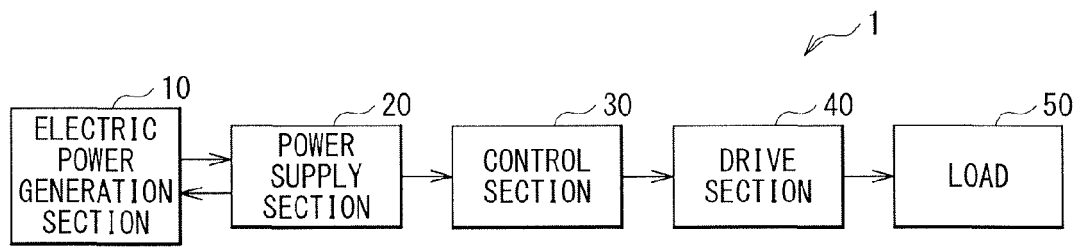

[ FIG. 37A ]
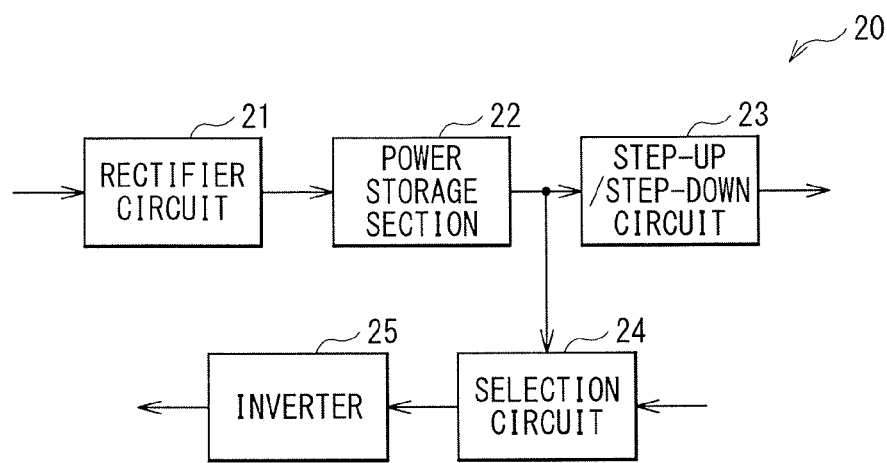
[ FIG. 37B ]
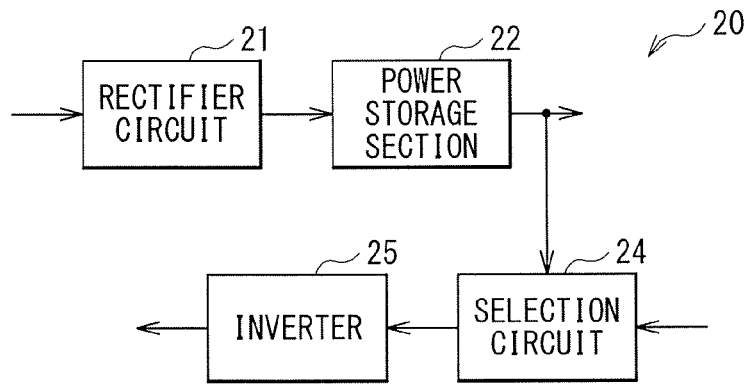

[ FIG. 38A ]
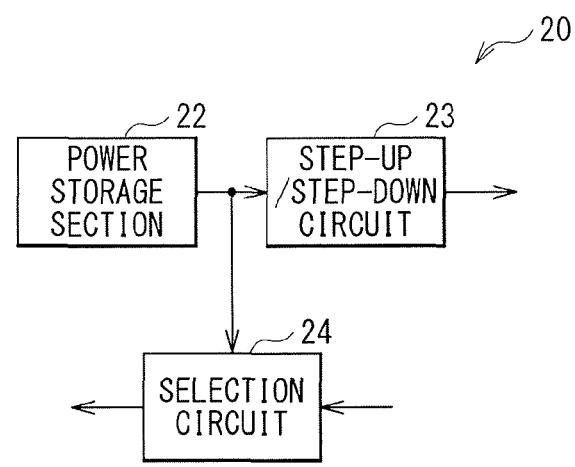
[ FIG. 38B ]
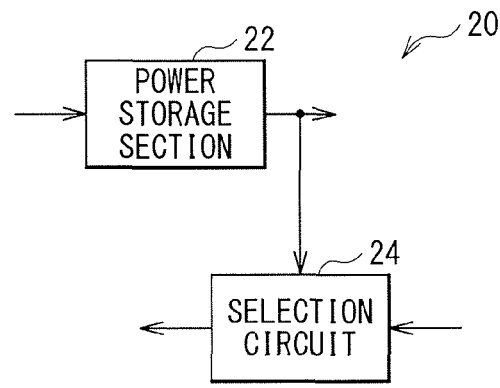

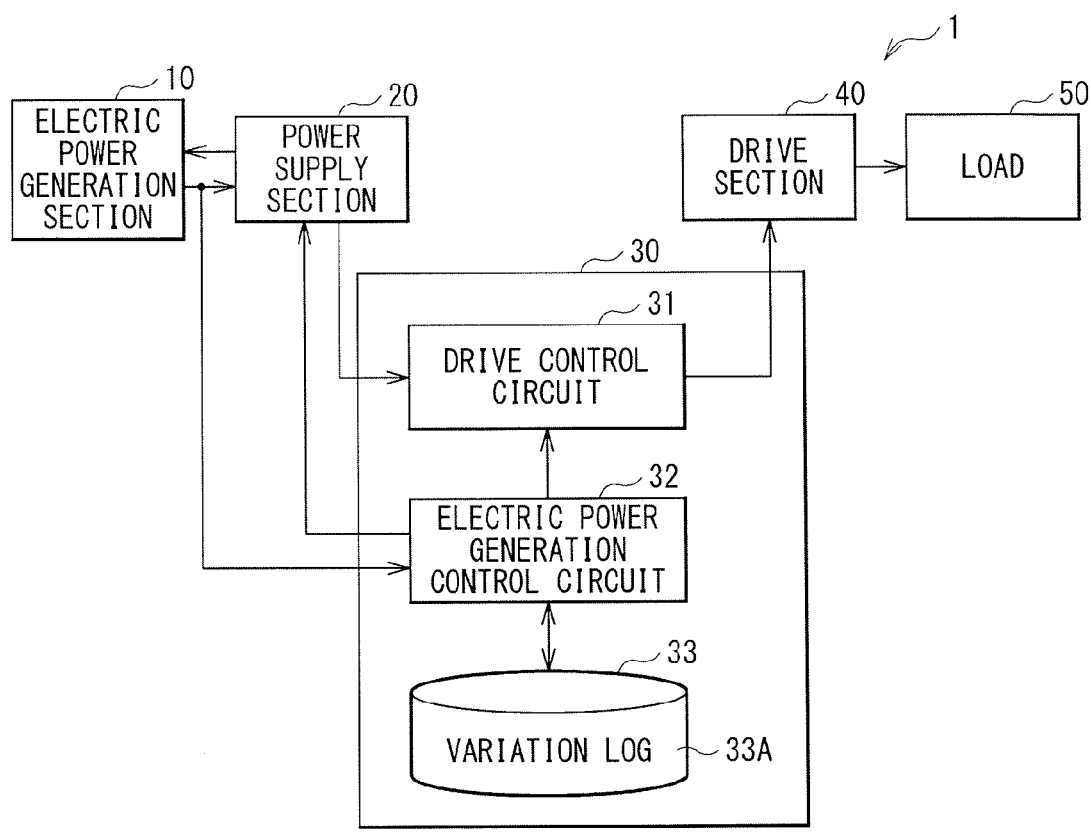
[ FIG. 39 ]

[ FIG. 40 ]
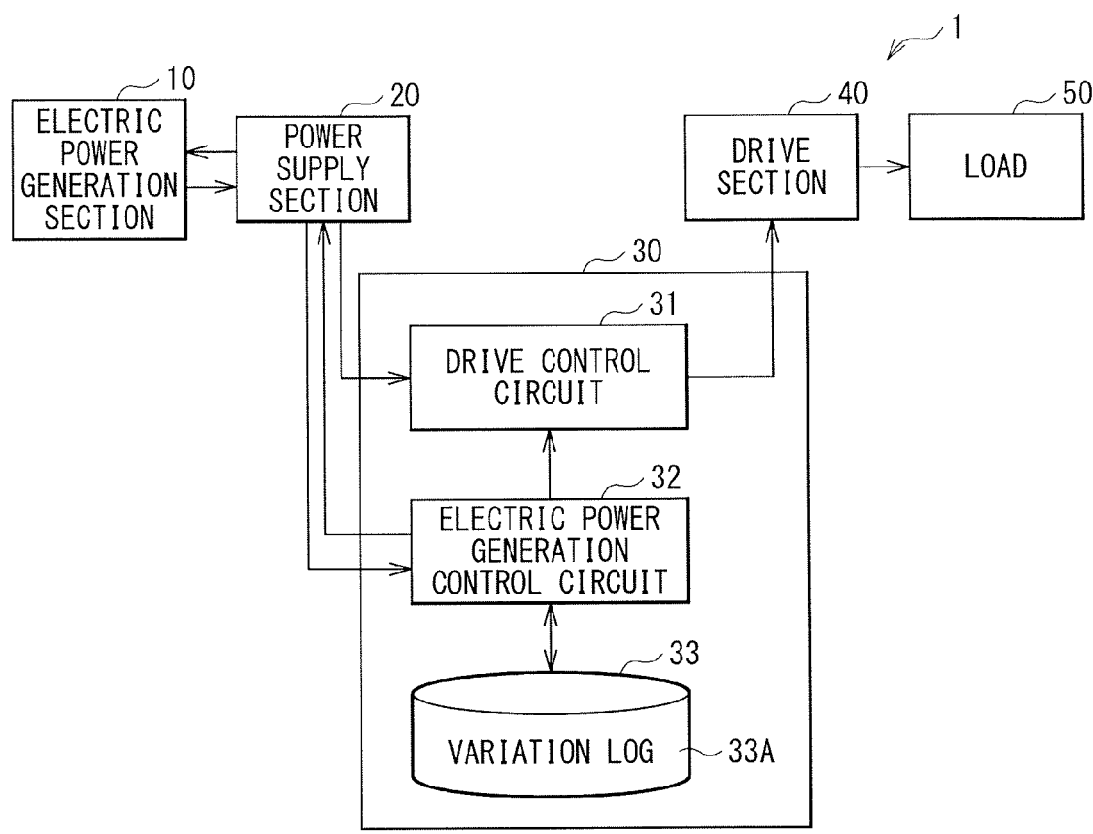

[ FIG. 41 ]
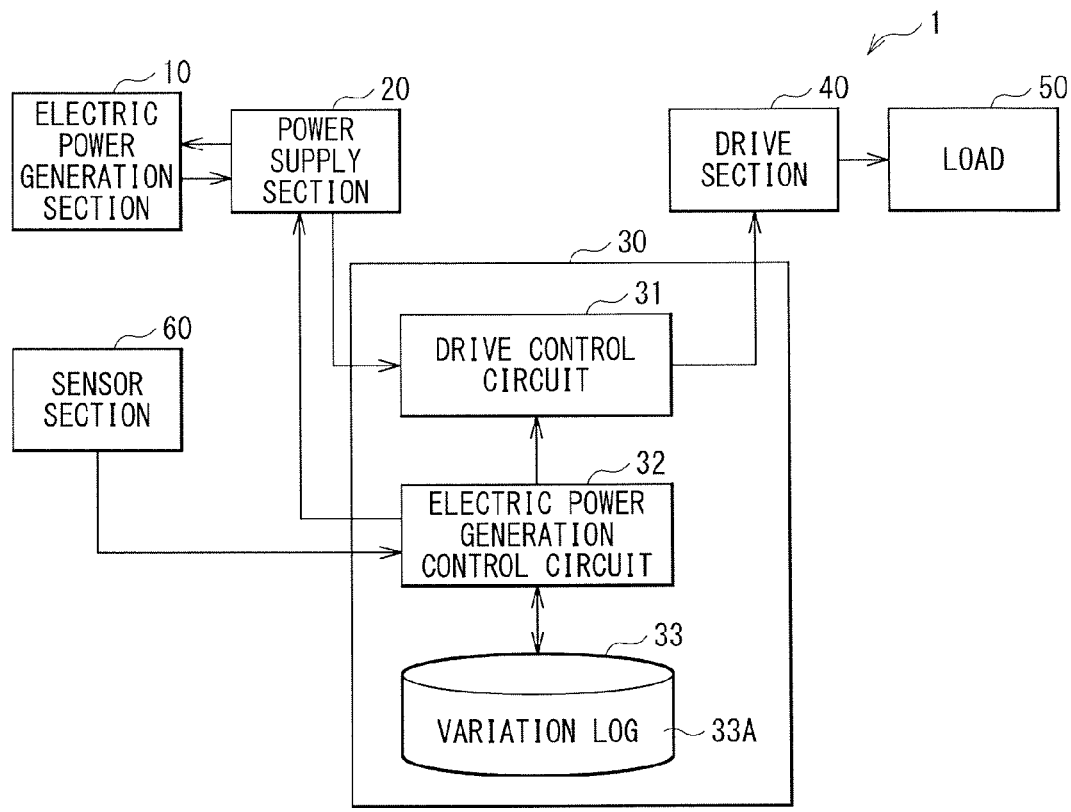
[ FIG. 42 ]
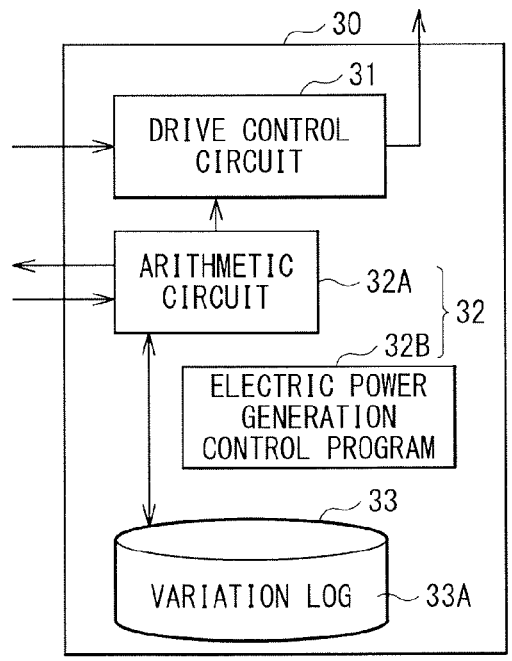

[ FIG. 43 ]
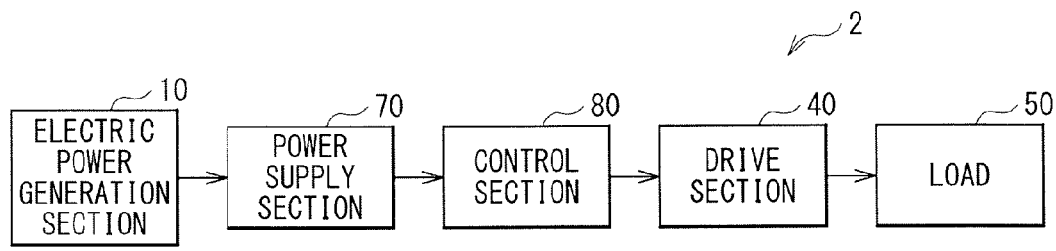
[ FIG. 44A ]
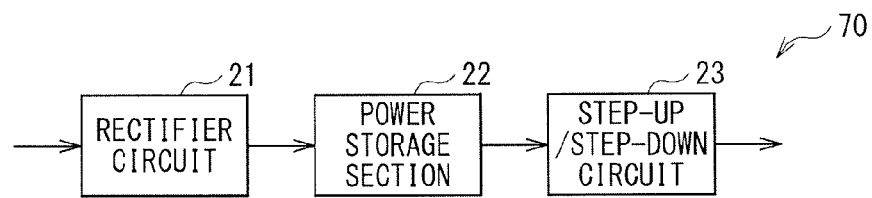
[ FIG. 44B ]
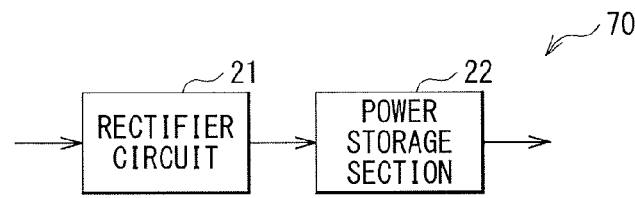
[ FIG. 45A ]
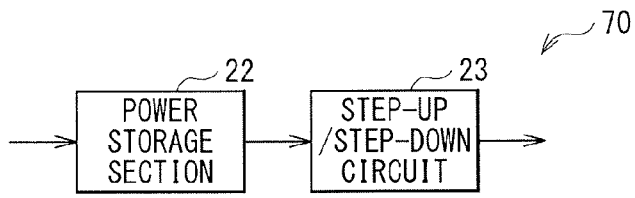
[ FIG. 45B ]
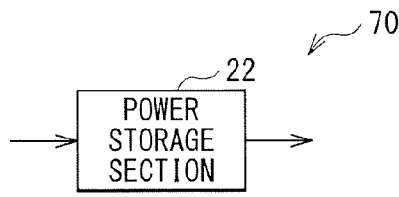

[ FIG. 46 ]
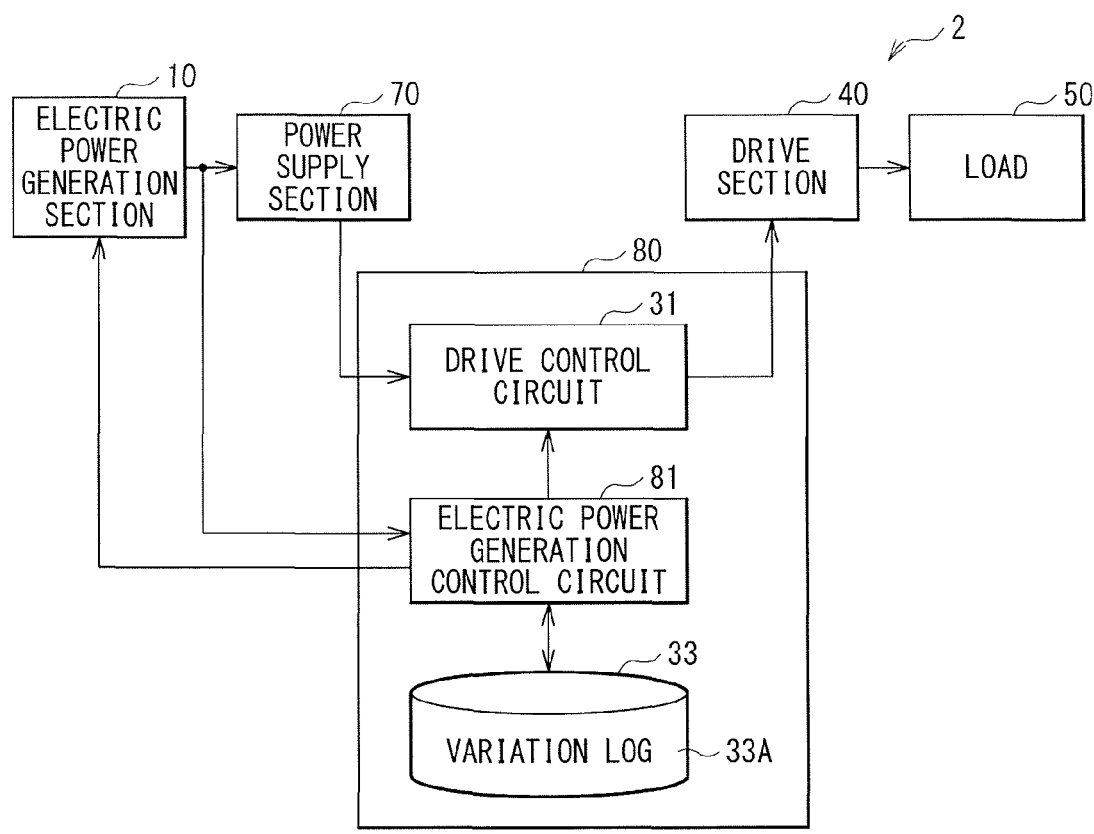

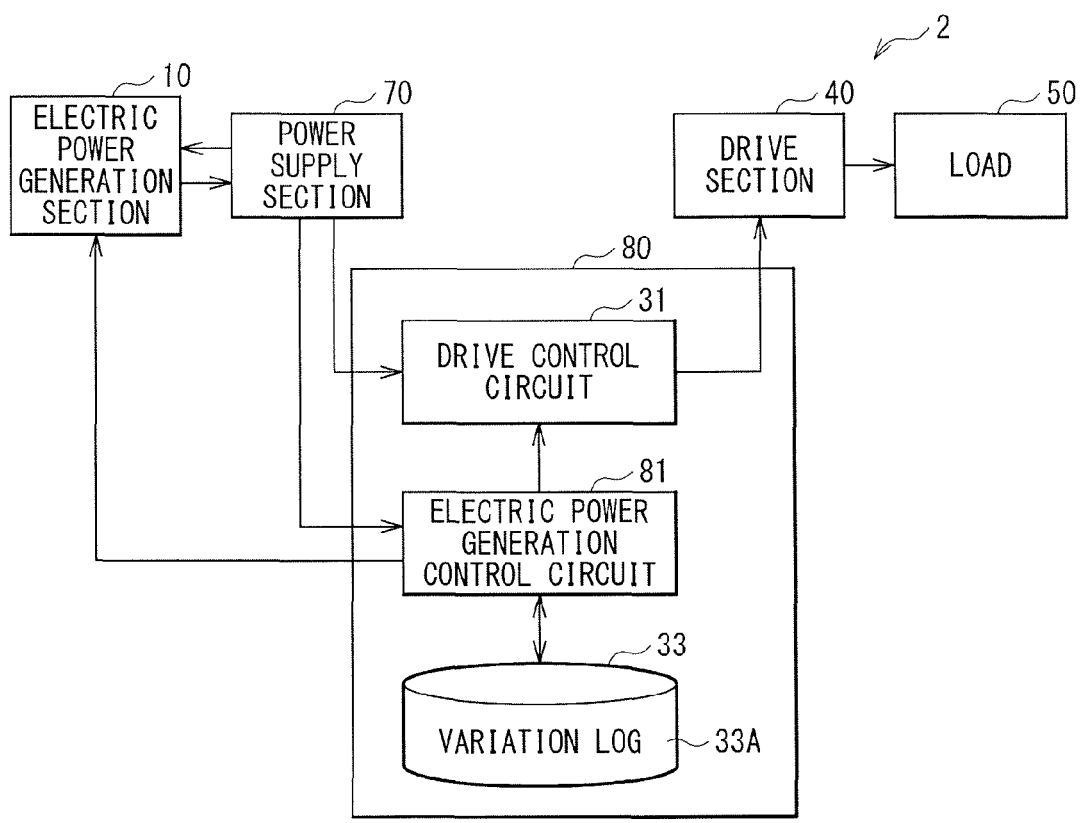
[FIG. 47]

[ FIG. 48 ]
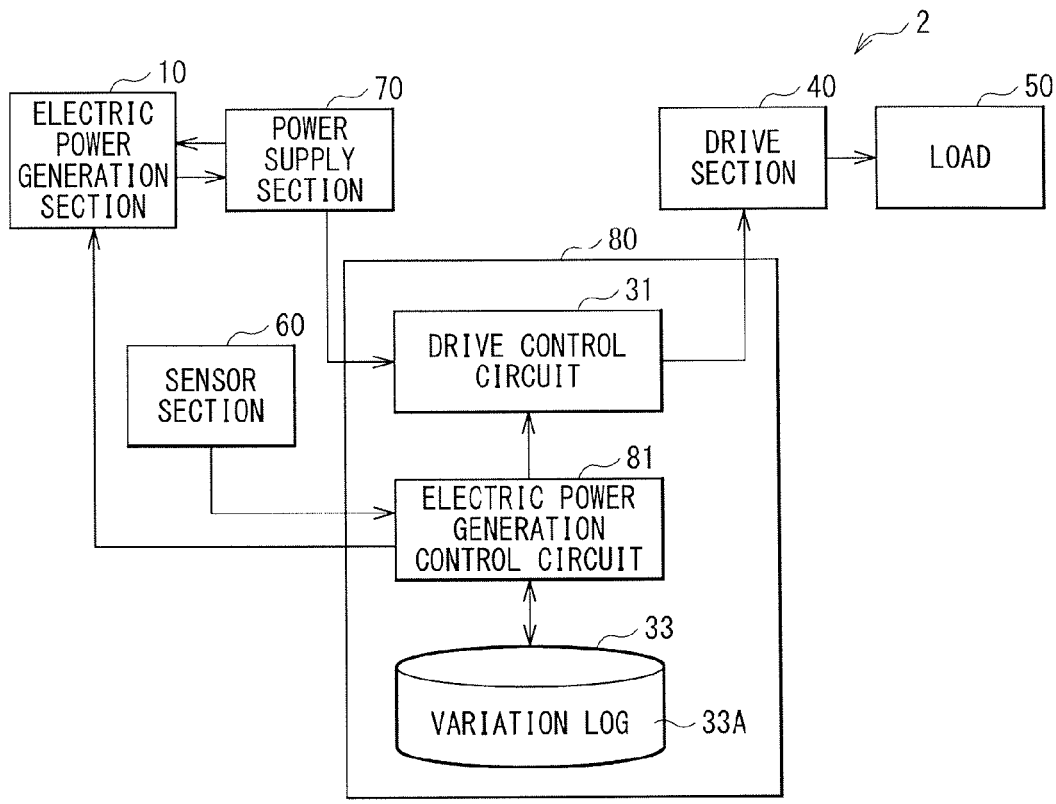
[ FIG. 49 ]
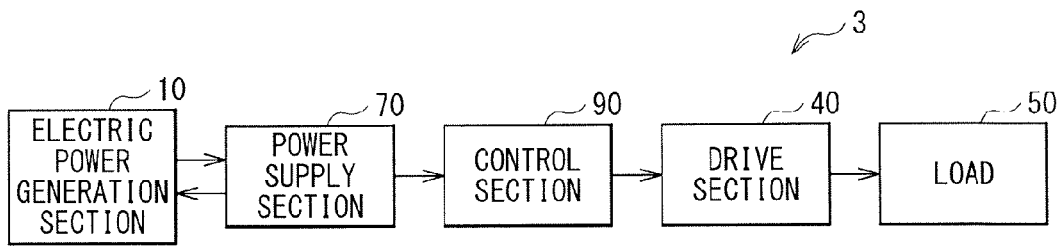

[ FIG. 50 ]
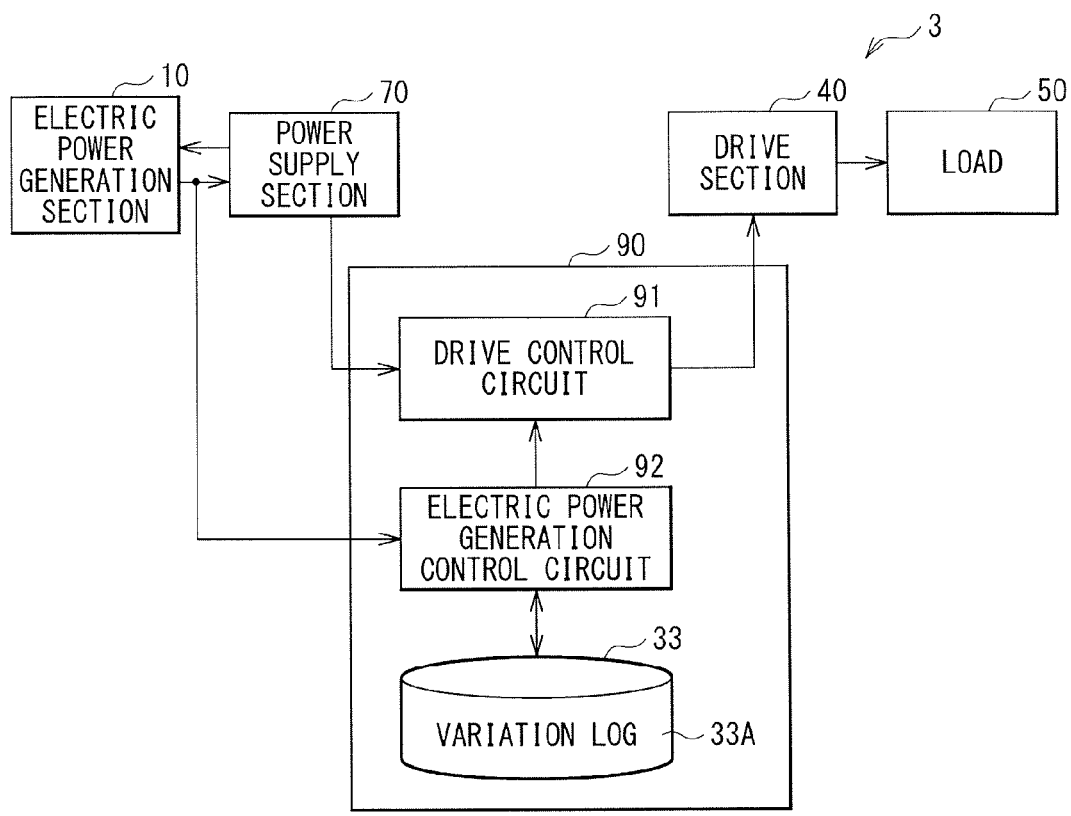

[ FIG. 51 ]
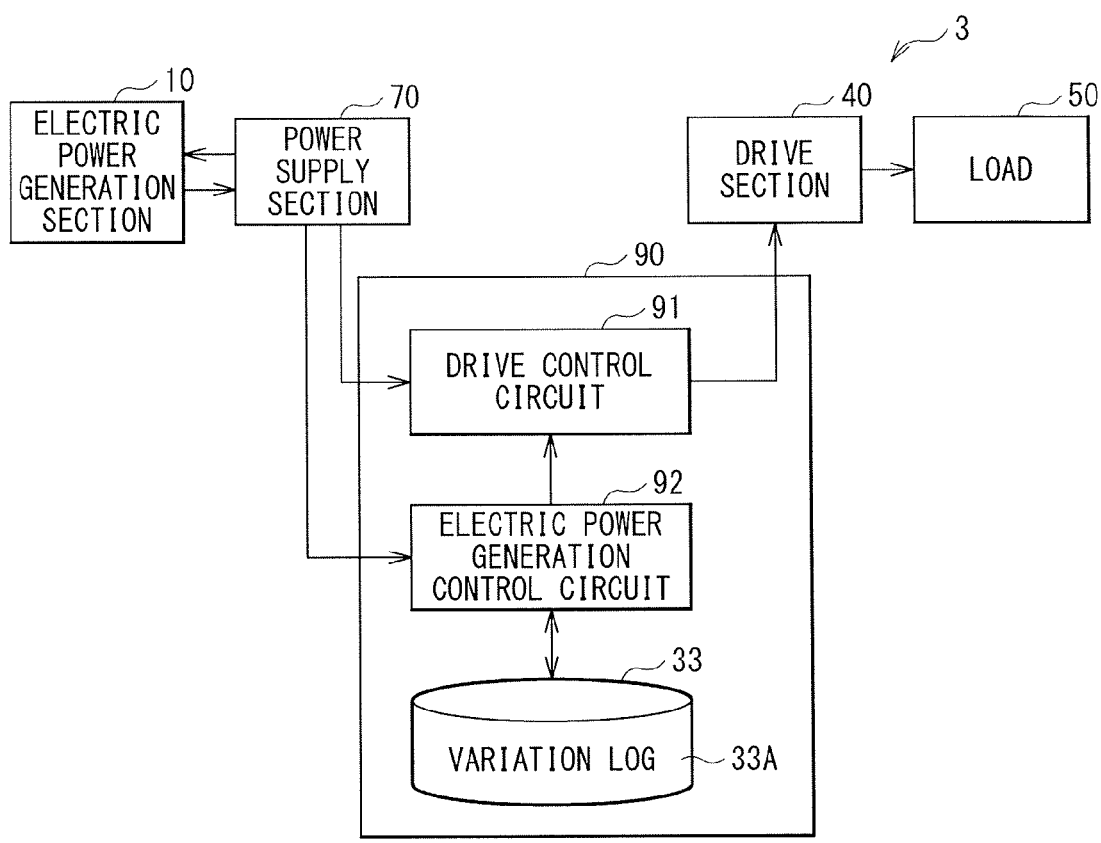

[ FIG. 52 ]
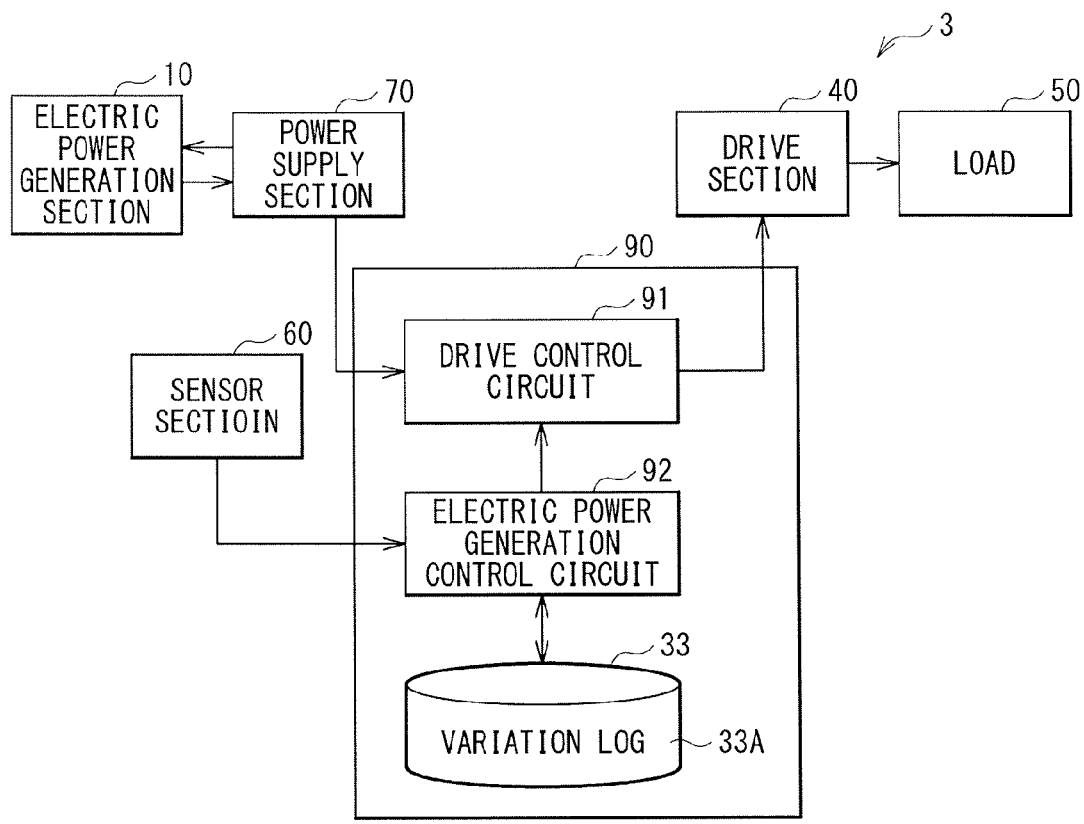
[ FIG. 53A ]
| ASSISTANCE MODE | REPRODUCE SLEEP-INDUCING MUSIC |
|---|---|
[ FIG. 53B ]
| ASSISTANCE MODE | REPRODUCE MUSIC MATCHING USER'S FEELING |
|---|---|

ELECTRIC POWER GENERATION CONTROL SYSTEM, ELECTRIC POWER GENERATION CONTROL PROGRAM, AND ELECTRONIC APPARATUS

TECHNICAL FIELD

The present technology relates to an electric power generation control system and an electric power generation control program that are suitable for small electronic apparatuses. Moreover, the present technology relates to an electronic apparatus including the above-described electric power generation control system.

BACKGROUND ART

Recently, small electronic apparatuses each containing an electric power generation system to operate without battery replacement have been achieved (for example, refer to PTL 1). Such an electronic apparatus has a function of temporarily charging electric power generated by the electric power generation system to a secondary battery, and when electric power is not generated, the electronic apparatus is driven by electric power discharged from the secondary battery. Moreover, small electronic apparatuses each capable of being connected to a small electric power generation unit having a similar function to that of the above-described electric power generation system have been achieved. In such an electronic apparatus connected to the above-described electric power generation unit, the electric power generation unit is allowed to charge electric power to a secondary battery contained in the electronic apparatus, or to directly drive the electronic apparatus.

Therefore, the above-described electronic apparatus is allowed to operate for a long time even in an environment without an outlet and a replacement battery. Accordingly, in view of emergencies such as earthquake disaster, it is expected that a large number of small electronic apparatuses contain the electric power generation system or a system capable of being connected to the small electric power generation unit.

CITATION LIST

Patent Literature

[PTL 1] Japanese Unexamined Patent Application Publication No. 2001-346336

SUMMARY OF THE INVENTION

Incidentally, even though the above-described electric power generation system has control for increasing electric power generation efficiency at a certain point, basically, an electric power generation amount at the point in real time or external information obtained from other sensor information is used for the control. Therefore, in a case where electric power used for the control is large, or assistance (supply of electric power) for electric power generation is necessary in an early stage, it is expected that the electric power generation system may not function normally. Moreover, even in a case where electric power used for the control is not so large, or assistance for electric power generation is not necessary in an early stage, when a period in which the electric power generation amount is low continues for a long time, supply of electric power from a secondary battery may be stopped to avoid overdischarge. Thus, a typical electric power generation system has an issue that electric power generation with consideration of energy balance is not performed.

Accordingly, it is desirable to provide an electric power generation control system and an electric power generation program that are capable of performing electric power generation with consideration of energy balance, and an electronic apparatus including such a electric power generation control system.

An electric power generation control system according to an embodiment of the present technology includes the following three components:

(A1) a variation prediction section configured to predict future variation, based on a variation log including a plurality of variation patterns obtained from past physical quantities and a variation pattern obtained from a newly obtained physical quantity;

(A2) a balance calculation section configured to calculate energy balance between a electric power generation amount and a discharge amount with use of variation prediction in the variation prediction section; and (A3) a switching timing calculation section configured to calculate a timing of switching between various modes relating to electric power generation and discharge with use of the energy balance calculated by the balance calculation section.

An electric power generation control program according to an embodiment of the present technology allows, when executed by a computer, the computer to implement a method, the method including the following three steps:

(B1) variation prediction in which future variation is predicted, based on a variation log including a plurality of variation patterns obtained from past physical quantities and a variation pattern obtained from a newly obtained physical quantity;

(B2) balance calculation in which energy balance between an electric power generation amount and a discharge amount is calculated with use of the variation prediction; and (B3) switching timing calculation in which a timing of switching between various modes relating to electric power generation and discharge is calculated with use of the energy balance calculated in the balance calculation.

An electronic apparatus according to an embodiment of the present technology includes: an electric power generation section configured to generate electric power; a power supply section configured to accumulate electrical energy generated by the electric power generation section and output the accumulated voltage or a voltage corresponding the accumulated voltage; a drive section configured to drive a load; a drive control section configured to control the drive section; and an electric power generation control section configured to control the electric power generation section, the power supply section, or the drive control section. The electric power generation control section included in the electronic apparatus includes the above-described components (A1) to (A3).

In the electric power generation control system, the electric power generation control program, and the electronic apparatus according to the embodiments of the present technology, energy balance between the electric power generation amount and the discharge amount is calculated with use of variation prediction obtained, based on the variation log and the newly obtained variation pattern. Then, the timing of switching between various modes relating to electric power generation and discharge is calculated with use of the energy balance.

In the electric power generation control system, the electric power generation control program, and the electronic apparatus according to the embodiments of the present technology, the energy balance between the electric power generation amount and the discharge amount is calculated with use of variation prediction obtained, based on the variation log and the newly obtained variation pattern, and the timing of switching between various modes relating to electric power generation and discharge is calculated with use of the energy balance; therefore, electric power generation in consideration of energy balance is allowed to be performed.

BRIEF DESCRIPTION OF DRAWINGS

FIG. 1 is a functional block diagram of an electric power generation control system according to an embodiment of the present technology.

FIG. 2 is a diagram illustrating an example of kinds of modes in the electric power generation control system in FIG. 1.

FIG. 3A is a diagram illustrating an example of an assistance mode in FIG. 2.

FIG. 3B is a diagram illustrating another example of the assistance mode in FIG. 2.

FIG. 4A is a schematic diagram for describing a mode A (in a case where balance is negative) in FIG. 3A.

FIG. 4B is a schematic diagram for describing the mode A (in a case where balance is positive) in FIG. 3A.

FIG. 5A is a schematic diagram for describing a mode B (in a case where balance is negative) in FIG. 3B.

FIG. 5B is a schematic diagram for describing the mode B (in a case where balance is positive) in FIG. 3B.

FIG. 6 is a diagram illustrating a first modification example of the kinds of modes in the electric power generation control system in FIG. 1.

FIG. 7A is a diagram illustrating an example of a tuning mode in FIG. 6.

FIG. 7B is a diagram illustrating another example of the tuning mode in FIG. 6.

FIG. 7C is a diagram illustrating still another example of the tuning mode in FIG. 6.

FIG. 7D is a diagram illustrating a still example of the tuning mode in FIG. 6.

FIG. 8A is a schematic diagram for describing each mode (in a case where balance is small) in FIG. 7.

FIG. 8B is a schematic diagram for describing each mode (in a case where balance is large) in FIG. 7.

FIG. 9 is a diagram illustrating a second modification example of the kinds of modes in the electric power generation control system in FIG. 1.

FIG. 10 is a diagram illustrating a third modification example of the kinds of modes in the electric power generation control system in FIG. 1.

FIG. 11 is a diagram illustrating a fourth modification example of the kinds of modes in the electric power generation control system in FIG. 1.

FIG. 12A is a diagram illustrating an example of a tuning mode (in a case where balance is reduced) in FIGS. 10 and 11.

FIG. 12B is a diagram illustrating an example of the tuning mode (in a case where balance is recovered) in FIGS. 10 and 11.

FIG. 13A is a diagram illustrating another example of the tuning mode (in a case where balance is reduced) in FIGS. 10 and 11.

FIG. 13B is a diagram illustrating another example of the tuning mode (in a case where balance is recovered) in FIGS. 10 and 11.

FIG. 14A is a diagram illustrating still another example of the tuning mode (in a case where balance is reduced) in FIG. 11.

FIG. 14B is a diagram illustrating still another example of the tuning mode (in a case where balance is recovered) in FIG. 11.

FIG. 15 is a diagram illustrating a fifth modification example of the kinds of modes in the electric power generation control system in FIG. 1.

FIG. 16 is a diagram illustrating a sixth modification example of the kinds of modes in the electric power generation control system in FIG. 1.

FIG. 17A is a diagram illustrating an example of a tuning mode (in a case where balance is reduced) in FIGS. 15 and 16.

FIG. 17B is a diagram illustrating an example of the tuning mode (in a case where balance is recovered) in FIGS. 15 and 16.

FIG. 18A is a diagram illustrating another example of the tuning mode (in a case where balance is reduced) in FIG. 16.

FIG. 18B is a diagram illustrating another example of the tuning mode (in a case where balance is recovered) in FIG. 16.

FIG. 19 is a diagram illustrating an example of function blocks of a switching timing prediction section in FIG. 1.

FIG. 20 is a diagram illustrating a first modification example of the function blocks of the switching timing prediction section in FIG. 1.

FIG. 21 is a diagram illustrating a second modification example of the function block of the switching timing prediction section in FIG. 1.

FIG. 22 is a diagram illustrating a third modification example of the function blocks of the switching timing prediction section in FIG. 1.

FIG. 23 is a diagram illustrating a fourth modification example of the function blocks of the switching timing prediction section in FIG. 1.

FIG. 24 is a diagram illustrating a fifth modification example of the function blocks of the switching timing prediction section in FIG. 1.

FIG. 25 is a diagram illustrating a sixth modification example of the function blocks of the switching timing prediction section in FIG. 1.

FIG. 26 is a diagram illustrating a seventh modification example of the function blocks of the switching timing prediction section in FIG. 1.

FIG. 27 is a diagram illustrating an eighth modification example of the function blocks of the switching timing prediction section in FIG. 1.

FIG. 28 is a diagram illustrating a ninth modification example of the function blocks of the switching timing prediction section in FIG. 1.

FIG. 29 is a diagram illustrating a tenth modification example of the function blocks of the switching timing prediction section in FIG. 1.

FIG. 30 is a diagram illustrating an eleventh modification example of the function blocks of the switching timing prediction section in FIG. 1.

FIG. 31 is a diagram illustrating an example of processes by the switching timing prediction section in FIG. 19.

FIG. 32 is a diagram illustrating an example of processes by the switching timing prediction section in FIG. 20.

FIG. 33 is a diagram illustrating an example of processes by the switching timing prediction section in FIG. 21.

FIG. 34 is a diagram illustrating an example of processes by the switching timing prediction section in FIG. 26.

FIG. 35 is a diagram illustrating an example of processes by the switching timing prediction section in FIG. 27.

FIG. 36 is a diagram illustrating an example of function blocks of an electronic apparatus according to an application example.

FIG. 37A is a diagram illustrating an example of functional blocks (with a step-up/step-down circuit) of a power supply section in FIG. 36.

FIG. 37B is a diagram illustrating an example of functional blocks (without a step-up/step-down circuit) of the power supply section in FIG. 36.

FIG. 38A is a diagram illustrating a modification example of the functional blocks (with a step-up/step-down circuit) of the power supply section in FIG. 36.

FIG. 38B is a diagram illustrating a modification example of the functional blocks (without a step-up/step-down circuit) of the power supply section in FIG. 36.

FIG. 39 is a diagram illustrating a first modification example of the functional blocks of the electronic apparatus in FIG. 36.

FIG. 40 is a diagram illustrating a second modification example of the functional blocks of the electronic apparatus in FIG. 36.

FIG. 41 is a diagram illustrating a third modification example of the functional blocks of the electronic apparatus in FIG. 36.

FIG. 42 is a diagram illustrating a modification example of functional blocks of a control section in FIG. 36.

FIG. 43 is a diagram illustrating another example of the functional blocks of the electronic apparatus according to the application example.

FIG. 44A is a diagram illustrating an example of functional blocks (with a step-up/step-down circuit) of a power supply section in FIG. 43.

FIG. 44B is a diagram illustrating an example of functional blocks (without a step-up/step-down circuit) of the power supply section in FIG. 43.

FIG. 45A is a diagram illustrating a modification example of the functional blocks (with a step-up/step-down circuit) of the power supply section in FIG. 43.

FIG. 45B is a diagram illustrating a modification example of the functional blocks (without a step-up/step-down circuit) of the power supply section in FIG. 43.

FIG. 46 is a diagram illustrating a first modification example of the functional blocks of the electronic apparatus in FIG. 43.

FIG. 47 is a diagram illustrating a second modification example of the functional blocks of the electronic apparatus in FIG. 43.

FIG. 48 is a diagram illustrating a third modification example of the functional blocks of the electronic apparatus in FIG. 43.

FIG. 49 is a diagram illustrating still another example of the functional blocks of the electronic apparatus according to the application example.

FIG. 50 is a diagram illustrating a first modification example of the functional blocks of the electronic apparatus in FIG. 49.

FIG. 51 is a diagram illustrating a second modification example of the functional blocks of the electronic apparatus in FIG. 49.

FIG. 52 is a diagram illustrating a third modification example of the functional blocks of the electronic apparatus in FIG. 49.

FIG. 53A is a diagram illustrating a modification example of the assistance mode in FIG. 2.

FIG. 53B is a diagram illustrating another modification example of the assistance mode in FIG. 2.

DESCRIPTION OF EMBODIMENTS

Some embodiments of the present disclosure will be described below referring to the accompanying drawings. It is to be noted that description will be given in the following order.
1. Embodiment
2. Application Example

1. EMBODIMENT

[Configuration]
FIG. 1 illustrates an example of functional blocks of an electric power generation control system 100 according to an embodiment of the present technology. The electric power generation control system 100 is a system suitable for a small electronic apparatus, and may include, for example, a switching timing prediction section 110 and a mode control section 120. Examples of the small electronic apparatus include portable music players (for example, Walkman (registered trademark)), portable game machines (for example, PSP (registered trademark)), portable communication devices, small personal computers, electronic books, and clocks.

The switching timing prediction section 110 predicts a timing of switching between various modes relating to electric power generation and discharge so as to have positive energy balance or to increase energy balance. It is to be noted that the switching timing prediction section 110 will be described in detail later. The mode control section 120 executes switching between various modes at a timing of switching predicted by the switching timing prediction section 110.

(About Modes)
For example, as illustrated in FIG. 2, the various modes may include three modes in total, i.e., an electric power generation mode, an assistance mode, and a sleep mode. The electric power generation mode is a mode of generating electric power by an electric power generation system and accumulating electrical energy generated by the electric power generation system in an electric power storage system. The sleep mode is a mode of stopping driving of a load, and is a mode of not performing electric power generation in the electric power generation system and not supplying electric power from the electric power storage system to the load. The assistance mode is a mode of performing assistance to the electric power generation system or assistance to a user of an electronic apparatus containing the electric power generation control system 100 (hereinafter, simply referred to as "user"). More specifically, as illustrated in FIGS. 3A and 3B, the assistance mode is a mode A of supplying energy from the electric power storage system to the electric power generation system, or a mode B of reproducing music inducing an increase in an electric power generation amount.

For example, in a case where the electric power generation system is a electromagnetic induction generator in which a magnet or a coil is provided as a core sphere, and a coil is provided to the outside of the core sphere, the mode A is a mode of supplying electric power from the electric power storage system to the coil provided to the outside so as to allow the core sphere to rotate at a certain or more number of revolutions. Moreover, the mode B may be, for example, a mode of reproducing an up-tempo number, accelerating reproduction speed, or changing a reproduced melody to a cheerful melody. It is to be noted that it is known that a music melody and human behavior correlate with each other, and when the melody is changed as described above, the electric power generation amount in the electric power generation system is allowed to be increased.

In a case where the mode A is a mode that needs assistance for electric power generation in an early stage, for example, as illustrated in FIG. 4A, when mode switching between two modes, i.e., the electric power generation mode and the mode A is executed, there is a possibility that energy balance is negative. On the other hand, for example, as illustrated in FIG. 4B, the switching timing prediction section 110 sets a period of the mode A short, based on prediction, and a period of the sleep mode with less electric power consumption is set long to compensate for the short period of the mode A, thereby enhancing a possibility that energy balance is positive.

Moreover, in a case where the mode A is a mode that needs assistance for electric power generation, for example, as illustrated in FIG. 5A, when an execution period of the mode A is long, there is a possibility that energy balance is negative. On the other hand, for example, as illustrated in FIG. 5B, the switching timing prediction section 110 executes the mode B, based on prediction, and makes the user to generate electric power without thinking and successfully shift into the electric power generation mode, thereby enhancing a possibility that energy balance is positive.

It is to be noted that the various modes are not limited to the above-described three modes, and, for example, as illustrated in FIG. 6, the various modes may include three modes in total, i.e., the electric power generation mode, a tuning mode, and the sleep mode. The tuning mode is a mode of tuning the electric power generation system so as to increase the electric power generation amount, and may be, for example, a mode of tuning a key component in the electric power generation system to increase electric power generation efficiency. For example, in a case where the electric power generation system is configured of the above-described electromagnetic induction generator, and generates an AC voltage with a frequency corresponding to vibration frequency of the core sphere, for example, as illustrated in FIG. 7A, the tuning mode may be a mode of tuning a circuit constant to have resonant frequency corresponding to vibration frequency of the electric power generation system. Moreover, for example, in a case where the electric power generation system is configured of the above-described electromagnetic induction generator, and generates an AC voltage with a frequency corresponding to the vibration frequency of the core sphere, for example, as illustrated in FIG. 7B, the tuning mode may be a mode of adjusting the orientation of the electric power generation system to a direction corresponding to a vibration direction. Further, for example, in a case where the electric power generation system is configured of a photodiode, and electric power generation efficiency has dependence on an incident angle of light or an electromagnetic wave, for example, as illustrated in FIG. 7C, the tuning mode may be a mode of adjusting the orientation of the electric power generation system to a direction corresponding to an incident direction of the light or the electromagnetic wave. Furthermore, for example, in a case where the electric power generation system is configured of an RF-ID tag, and electric power generation efficiency is dependent on frequency of the electromagnetic wave, for example, as illustrated in FIG. 7D, the tuning mode may be a mode of tuning the circuit constant to have resonant frequency corresponding to the frequency of the incident electromagnetic wave.

For example, as illustrated in FIG. 8A, in a case where a situation in which the electric power generation amount is reduced occurs in the electric power generation mode, there is a possibility that the energy balance is reduced. It is to be noted that examples of the situation in which the electric power generation amount is reduced may include a situation in which light or an electromagnetic wave is directed to a direction different from an initial direction, and a situation in which vibration frequency of the electric power generation system is changed with change in user's behavior. On the other hand, for example, as illustrated in FIG. 8B, the switching timing prediction section 110 predicts the situation in which the electric power generation amount is reduced, and executes the tuning mode to avoid or minimize a reduction in the electric power generation amount, thereby enhancing a possibility that energy balance is increased.

Moreover, for example, as illustrated in FIG. 9, the various modes may include four modes in total, i.e., the electric power generation mode, the assistance mode, the tuning mode, and the sleep mode. Further, for example, as illustrated in FIG. 10, while the various modes may include three modes in total, i.e., the electric power generation mode, the assistance mode, and the sleep mode, each of the electric power generation mode and the assistance mode may include the tuning mode. It is to be noted that, in FIG. 10, a normal mode indicates a mode not including the tuning mode in the electric power generation mode or the assistance mode. Furthermore, for example, as illustrated in FIG. 11, while the various modes include three modes in total, i.e., the electric power generation mode, the assistance mode, and the sleep mode, each of the three modes may further include the tuning mode.

For example, as illustrated in FIG. 12A, in a case where a situation in which the electric power generation amount is reduced occurs in the electric power generation mode, there is a possibility that energy balance is reduced. On the other hand, for example, as illustrated in FIG. 12B, the switching timing prediction section 110 predicts the situation in which the electric power generation amount is reduced, and executes the tuning mode in the electric power generation mode to avoid or minimize a reduction in the electric power generation amount, thereby enhancing a possibility that energy balance is increased. Moreover, for example, in a case where a situation in which the electric power generation amount is reduced in a next electric power generation mode occurs in the assistance mode, as illustrated in FIG. 13A, there is a possibility that energy balance is reduced. On the other hand, for example, as illustrated in FIG. 13B, the switching timing prediction section 110 predicts the situation in which the electric power generation amount is reduced, and executes the tuning mode in the assistance mode to avoid or minimize a reduction in the electric power generation amount in the next electric power generation mode, thereby enhancing a possibility that energy balance is increased. Further, in a case where a situation in which the electric power generation amount is reduced in a next electric power generation mode occurs in the sleep mode, as illustrated in FIG. 14A, there is a possibility that energy balance is reduced. On the other hand, for example, as illustrated in FIG. 14B, the switching timing prediction section 110 predicts the situation in which the electric power generation amount is reduced, and executes the tuning mode in the sleep mode to avoid or minimize a reduction in the electric power generation amount in the next electric power generation mode, thereby enhancing a possibility that energy balance is increased.

Moreover, for example, as illustrated in FIG. 15, the various modes may include two modes in total, i.e., the electric power generation mode and the sleep mode, and the electric power generation mode may further include the tuning mode. Further, for example, as illustrated in FIG. 16, the various modes may include two modes in total, i.e., the electric power generation mode and the sleep mode, and each of the modes may further include the tuning mode.

For example, as illustrated in FIG. 17A, in a case where a situation in which the electric power generation amount is reduced occurs in the electric power generation mode, there is a possibility that energy balance is reduced. On the other hand, for example, as illustrated in FIG. 17B, the switching timing prediction section 110 predicts the situation in which the electric power generation amount is reduced, and executes the tuning mode in the electric power generation mode to avoid or minimize a reduction in the electric power generation amount, thereby enhancing a possibility that energy balance is increased. Further, for example, in a case where a situation in which the electric power generation amount is reduced in a next electric power generation mode occurs in the sleep mode, as illustrated in FIG. 18A, there is a possibility that energy balance is reduced. On the other hand, for example, as illustrated in FIG. 18B, the switching timing prediction section 110 predicts the situation in which the electric power generation amount is reduced, and executes the tuning mode in the sleep mode to avoid or minimize a reduction in the electric power generation amount in the next electric power generation mode, thereby enhancing a possibility that energy balance is increased.

(About Switching Timing Prediction Section 110)

Next, the switching timing prediction section 110 will be described below. For example, as illustrated in FIG. 19, the switching timing prediction section 110 may include a physical quantity detection section 111, a variation pattern recognition section 112, a variation prediction section 113, a balance calculation section 114, a switching timing calculation section 115, and a database 116.

The physical quantity detection section 111 is configured to detect a physical quantity. Herein, the physical quantity may be, for example, instantaneous generated electric power or momentum obtained by temporally differentiating the electric power generation amount (electric power amount) of the electric power generation system, or acceleration obtained by temporally differentiating the momentum. It is to be noted that, in a case where a gyro mechanism as a sensor is provided to an electronic apparatus containing the electric power generation control system 100, the above-described physical quantity may be an output (acceleration) of the gyro mechanism or momentum obtained by integrating the output of the gyro mechanism. Moreover, in a case where a thermometer as a sensor is provided to the electronic apparatus containing the electric power generation control system 100, the above-described physical quantity may be a temperature obtained by the thermometer. Further, in a case where a photodiode as a sensor is provided to the electronic apparatus containing the electric power generation control system 100, the above-described physical quantity may be a light amount or strength of an electromagnetic wave obtained by the photodiode. Furthermore, in a case where a RF-ID tag as a sensor is provided to the electronic apparatus containing the electric power generation control system 100, the above-described physical quantity may be an output (an antenna output) of the RF-ID tag.

The variation pattern recognition section 112 is configured to recognize a variation pattern from the physical quantity detected by the physical quantity detection section 111. The variation pattern recognition section 112 may recognize, for example, a behavior pattern of the user as the variation pattern from the detected physical quantity. It is to be noted that the variation pattern recognition section 112 may recognize a moving pattern of a moving body mounted in the electric power generation control system 100 as the variation pattern from the detected physical quantity. Moreover, the variation pattern recognition section 112 may recognize a variation pattern of an ambient environment of the electric power generation control system 100 as the variation pattern from the detected physical quantity.

As used herein, examples of the behavior pattern of the user may include a behavior pattern in a daily working day, a behavior pattern during a business trip, and a behavior pattern in days off on Saturday and Sunday. Examples of the behavior pattern in the daily working day may be a behavior pattern in which the user wakes up at six in the morning, travels by train from seven to eight-thirty in the morning, does desk work till five-thirty in the evening except for one-hour lunchtime, travels by train from five-thirty to seven in the evening to get back home, and goes to bed at eleven in the evening. Moreover, examples of the moving pattern of the moving body may include a daily moving pattern of the moving body mounted in the electric power generation control system 100, a moving pattern during a business trip, and a moving pattern in days off on Saturday and Sunday. Further, examples of the variation pattern of the ambient environment may include a variation pattern of an ambient temperature of the electric power generation control system 100, a variation pattern of an incident direction of light or an electromagnetic wave around the electric power generation control system 100, and a variation pattern of a frequency of a electromagnetic wave around the electric power generation control system 100.

As a method of recognizing the behavior pattern of the user or the moving pattern of the moving body, for example, methods described in Japanese Unexamined Patent Application Publication No. 2006-340903, WO06-001129, Japanese Unexamined Patent Application Publication No. 2006-345269, Japanese Patent No. 4507992, Japanese Unexamined Patent Application Publication No. 2006-345270, Japanese Patent No. 4289326, Japanese Unexamined Patent Application Publication Nos. 2008-3655, 2009-118513, 2010-134802, and 2010-198595, Japanese Patent Application No. 2011-069840, and the like may be used.

The variation prediction section 113 is configured to predict future variation, based on a variation log 116A including various kinds of variation patterns obtained from past physical quantities and a variation pattern obtained from a newly obtained physical quantity. As illustrated in FIG. 19, the variation log 116A is stored in the database 116. For example, the variation prediction section 113 may perform comparison between characteristics of the newly obtained variation pattern and characteristics of each of the variation patterns included in the variation log 116A of the database 116. For example, in a case where the variation prediction section 113 determines, by a result of the comparison, that the characteristics of the newly obtained variation pattern is similar to some of the characteristics of one of the variation patterns included in the variation log 116A, the variation prediction section 113 predicts future variation with use of the variation pattern. Moreover, for example, in a case where, as a result of the comparison, the variation prediction section 113 does not find a variation pattern with characteristics same as or similar to those of the newly obtained variation pattern from the variation log 116A, the variation prediction section 113 performs the above-described comparison again with use of a next variation pattern that is input from the variation pattern recognition section 112.

The balance calculation section 114 calculates energy balance between the electric power generation amount and a discharge amount with use of variation prediction obtained by the variation prediction section 113. The energy balance is energy balance between the electric power generation amount and the discharge amount in a calculation period predetermined by the user or the electric power generation control system 100. An energy balance calculation period may be, for example, one day from six in the morning to six in the next morning. It is to be noted that, in a case where a period in which an electronic apparatus including the electric power generation control system 100 is charged is recorded in the variation log 116A stored in the database 116, the energy balance period may be a period except for the charge period.

The switching timing calculation section 115 calculates a timing of switching between various modes relating to electric power generation and discharge with use of the energy balance calculated by the balance calculation section 114. The switching timing calculation section 115 is configured to calculate a timing of switching between various modes relating to electric power generation and discharge so as to have higher energy balance than energy balance in the above-described calculation period calculated by the balance calculation section 114. The switching timing calculation section 115 may preferably calculate the timing of switching between various modes relating to electric power generation and discharge so as to have positive energy balance in the above-described calculation period. The database 116 may have, for example, basic information necessary for calculation of the above-described energy balance. Examples of the basic information include an electric power generation amount or a power consumption amount per unit time of each of various modes.

To complement prediction in the variation prediction section 113 or/and to suppress detection resolution (sampling cycle•resolution, or the like) in necessary and sufficient physical quantity detection to reduce consumed energy in a control system, for example, as illustrated in FIG. 20, the switching timing prediction section 110 may include a detection timing setting section 117 configured to instruct the physical quantity detection section 111 to detect a physical quantity at a predetermined timing (for example, at every fixed timing). Moreover, to complement prediction in the variation prediction section 113, for example, as illustrated in FIG. 21, the switching timing prediction section 110 may include a detection timing setting section 118 configured to instruct the physical quantity detection section 111 to detect a physical quantity at a timing based on the timing of switching obtained by the switching timing calculation section 115.

The order of processes in the detection timing setting section 118 is not limited to the order illustrated in FIG. 21. In other words, as illustrated in FIG. 22, the switching timing prediction section 110 may detect a physical quantity at a timing reflecting prediction by the variation prediction section 113. Moreover, as illustrated in FIGS. 23 and 24, the switching timing prediction section 110 may detect a physical quantity at a timing reflecting the variation pattern recognized by the variation pattern recognition section 112 or balance calculated by the balance calculation section 114.

Further, as illustrated in FIG. 25, the switching timing prediction section 110 may reflect a trigger input from an external unit in setting of a timing of detecting a physical quantity.

In the above-described example, the detection timing setting section 118 configured to control the physical quantity detection section 111 is provided; however, in processes such as variation prediction, energy balance prediction, and switching timing calculation, a similar setting section may be provided. In other words, for example, as illustrated in FIG. 26, the switching timing prediction section 110 may include an execution timing setting section 119 configured to instruct the variation prediction section 113 to execute a process at a timing, based on variation prediction obtained by the variation prediction section 113. Moreover, for example, as illustrated in FIG. 27, the switching timing prediction section 110 may include the execution timing setting section 119 configured to instruct the variation prediction section 113 to execute a process at a timing, based on a result obtained by the balance calculation section 114. Further, for example, as illustrated in FIG. 28, the switching timing prediction section 110 may include the execution timing setting section 119 configured to instruct the variation prediction section 113 to execute a process at a timing, based on a result obtained by the switching timing calculation section 115. Furthermore, as illustrated in FIG. 29, the switching timing prediction section 110 may reflect a trigger input from an external unit in setting of a timing of execution by the variation prediction section 113.

It is to be noted that the execution timing setting section 119 is allowed to be used for setting of a timing of execution of any one of processes such as variation prediction, energy balance prediction, and switching timing calculation. Moreover, an input to the execution timing setting section 119 may be data obtained after any one of the processes according to setting of the above-described timing of detection or execution. For example, as illustrated in FIG. 30, the switching timing prediction section 110 may include the execution timing setting section 19 configured to instruct the balance calculation section 114 to execute a process at a timing, based on a result obtained by the switching timing calculation section 115.

[Operation]

Next, an example of an operation of the electric power generation control system 100 according to this embodiment will be described below referring to FIG. 31. In the electric power generation control system 100 according to this embodiment, first, a physical quantity is detected (S101), and then a variation pattern is recognized from the detected physical quantity (S102). Next, future variation is predicted, based on the variation log 116A including a plurality of kinds of variation patterns obtained from past physical quantities and a variation pattern obtained from the newly obtained physical quantity (S103). Then, energy balance between an electric power generation amount and a discharge amount is calculated with use of the above-described variation prediction (S104), and a timing of switching between various modes relating to electric power generation and discharge is calculated with use of the energy balance (S105). Finally, switching between various modes is executed at the predicted timing of switching (S106).

It is to be noted that, in a case where the detection timing setting section 117 or the detection timing setting section 118 as illustrated in FIGS. 20 to 25 is provided, prediction in the variation prediction section 113 is complemented at a predetermined timing set by them. For example, as illustrated in FIGS. 32 and 33, variation prediction obtained in the past is compared with newly obtained variation prediction to determine whether or not prediction is changed (S107). After that, the timing of detection is reset, based on a predicted timing of switching (S108), and a physical quantity is detected at the reset timing of detection (S101). Moreover, in a case where the execution timing setting section 119 as illustrated in FIGS. 26 to 29 is provided, prediction in the variation prediction section 113 is complemented at a predetermined timing set by the execution timing setting section 119. For example, as illustrated in FIGS. 34 and 35, variation prediction obtained in the past is compared with newly obtained variation prediction to determine whether or not prediction is changed (S107). After that, the timing of execution is reset, based on the newly obtained variation prediction or energy balance obtained by recalculation with use of the newly obtained variation prediction (S109), and variation prediction is executed at the reset timing (S103).

[Effects]

In this embodiment, energy balance between the electric power generation amount and the discharge amount is calculated with use of variation prediction obtained, based on the variation log 116A and the newly obtained variation pattern. Then, the timing of switching between various modes relating to electric power generation and discharge is calculated with use of the energy balance. Therefore, electric power generation in consideration of energy balance is allowed to be performed.

Moreover, in this embodiment, when the mode B is executed, the user is not forced to generate electric power, but voluntarily generates electric power with music; therefore, the electric power generation amount is allowed to be increased without providing a feeling of working to the user.

2. APPLICATION EXAMPLES

Application Example 1

An application example of the electric power generation control system 100 described in the above-described embodiment will be described below. FIG. 36 illustrates an application example of the electric power generation control system 100. The electric power generation control system 100 is applicable to an electronic apparatus 1 including an electric power generation system and an electric power storage system.

For example, as illustrated in FIG. 36, the electronic apparatus 1 may include an electric power generation section 10, a power supply section 20, a control section 30, a drive section 40, and a load 50. The electric power generation section 10 is configured to generate electric power. Examples of kind of electric power generation may include electromagnetic induction power generation, reverse magnetostrictive power generation, electrostatic power generation, piezoelectric power generation, thermoelectric power generation, thermionic power generation, power generation using a heat engine, photovoltaic power generation, indoor light energy harvesting, electromagnetic induction power generation such as rectenna, and power generation with use of oxygen reaction.

The drive section 40 is configured to drive the load 50 by control by the control section 30. The load 50 is driven by the drive section 40. The kind of the load 50 differs depending on the kind of the electronic apparatus 1. In a case where the electronic apparatus 1 is a portable music player, the load 50 may be, for example, a HDD, a speaker, or a liquid crystal panel. In a case where the electronic apparatus 1 is a clock, the load 50 may be, for example, an indicating needle.

The power supply section 20 is configured to accumulate electrical energy generated by the electric power generation section 10 and output the accumulated voltage or a voltage corresponding to the accumulated voltage. In a case where the electric power generation section 10 outputs AC electric power, for example, as illustrated in FIG. 37A, the power supply section 20 may include a rectifier circuit 21 configured to rectify AC electric power, a power storage section 22 configured to hold the rectified AC electric power, a step-up/step-down circuit 23 configured to increase or decrease a voltage of electric power stored in the power storage section 22, a selection circuit 24 configured to select on or off of an output different from the step-up/step-down circuit 23 of the power storage section 22, and an inverter 25 configured to convert DC electric power output from the selection circuit 24 into AC electric power. It is to be noted that, for example, as illustrated in FIG. 37B, the step-up/step-down circuit 23 may be removed, if necessary. Moreover, in a case where the electric power generation section 10 outputs DC electric power, for example, as illustrated in FIGS. 38A and 38B, the rectifier circuit 21 and the inverter 25 may be removed.

The control section 30 is configured to control the power supply section 20 in this application example. For example, as illustrated in FIG. 39, the control section 30 may include a drive control circuit 31 configured to control the drive section 40, an electric power generation control circuit 32 configured to control the power supply section 20, and a database 33 holding a variation log 33A corresponding to the variation log 116A. The electric power generation control circuit 32 of the control section 30 detects an output of the electric power generation section 10 as the above-described physical quantity, recognizes a variation pattern from the detected physical quantity, and predicts future variation, based on the variation log 33A corresponding to the variation log 116A and the variation pattern obtained from the newly obtained physical quantity. The electric power generation control circuit 32 of the control section 30 further calculates energy balance between the electric power generation amount and the discharge amount with use of variation prediction, and calculates a timing of switching between various modes relating to electric power generation and discharge with use of the energy balance thereby obtained. The electric power generation control circuit 32 of the control section 30 further executes switching between various modes according to the timing of switching obtained by calculation. For example, the assistance mode (mode A) is executed, the control section 30 outputs a signal (an on signal) that gives an instruction to execute the mode A from the electric power generation control circuit 32 to the selection circuit 24. For example, in a case where the electric power generation mode is executed, the control section 30 outputs a signal (an off signal) to stop the execution of the mode A from the electric power generation control circuit 32 to the selection circuit 24. For example, in a case where the sleep mode is executed, the control section 30 outputs a signal to stop driving of the drive section 40 from electric power generation control circuit 32 to the drive control circuit 31. When the drive control circuit 31 receives, from the electric power generation control circuit 32, the signal to stop driving of the drive section 40, the drive control circuit 31 outputs, to the drive section 40, the signal to stop driving of the drive section 40.

It is to be noted that, for example, as illustrated in FIG. 40, the control section 30 may detect an output of the power storage section 22 or an output of the step-up/step-down circuit 23 as the above-described physical quantity. Moreover, for example, as illustrated in FIG. 41, the control section 30 may detect an output of a sensor section 60 as the above-described physical quantity. The sensor section 60 may be configured of, for example, a gyro mechanism, a thermometer, a photodiode, a RF-ID tag, or the like. It is to be noted that, in a case where the sensor section 60 is configured of a gyro mechanism, the above-described physical quantity is an output (acceleration) of the gyro mechanism or momentum obtained by integrating the output of the gyro mechanism. Moreover, in a case where the sensor section 60 is configured of a thermometer, the above-described physical quantity is a temperature obtained by the thermometer. Further, in a case where the sensor section 60 is configured of a photodiode, the above-described physical quantity is a light amount or strength of an electromagnetic wave obtained by the photodiode. Furthermore, in a case where the sensor section 60 is configured of a RF-ID tag, the above-described physical quantity is an output (an antenna output) of the RF-ID tag.

Moreover, the control section 30 may be configured of any of circuits illustrated in FIGS. 39 to 41, and, for example, as illustrated in FIG. 42, the control section 30 may be configured by loading a light emission control program 32B having the same functions as the circuits illustrated in FIGS. 39 to 41 into an arithmetic circuit 32A.

Further, to complement variation prediction, for example, the control section 30 may detect the physical quantity in the electric power generation control circuit 32 at a predetermined timing (for example, at every fixed timing). Furthermore, to complement variation prediction, the control section 30 may detect the physical quantity in the electric power generation control circuit 32 at a timing, based on a derived timing of switching.

Application Example 2

FIG. 43 illustrates another application example of the electric power generation control system 100. The electric power generation control system 100 is applicable to an electronic apparatus 2 including an electric power generation system and an electric power storage system.

The electronic apparatus 2 may include, for example, the electric power generation section 10, a power supply section 70, a control section 80, the drive section 40, and the load 50. The power supply section 70 is configured to accumulate electrical energy generated by the electric power generation section 10 and output the accumulated voltage or a voltage corresponding to the accumulated voltage. In a case where the electric power generation section 10 outputs AC electric power, for example, as illustrated in FIG. 44A, the power supply section 70 may include the rectifier circuit 21, the power storage section 22, and the step-up/step-down circuit 23. In other words, unlike the power supply section 20, the power supply section 70 does not have a circuit driving the electric power generation section 10 as a motor. It is to be noted that, for example, as illustrated in FIG. 44B, the step-up/step-down circuit 23 may be removed, if necessary. Moreover, in a case where the electric power generation section 10 outputs DC electric power, for example, as illustrated in FIGS. 45A and 45B, the rectifier circuit 21 may be removed.

The control section 80 is configured to control the electric power generation section 10 in this application example. For example, as illustrated in FIG. 46, the control section 80 may include the drive control circuit 31, an electric power generation control circuit 81 configured to control the electric power generation section 10, and the database 33 holding the variation log 33A corresponding to the variation log 116A. The electric power generation control circuit 81 of the control section 80 detects an output of the electric power generation section 10 as the above-described physical quantity, recognizes a variation pattern from the detected physical quantity, and predicts future variation, based on the variation log 33A corresponding to the variation log 116A and the variation pattern obtained from the newly obtained physical quantity. The electric power generation control circuit 81 of the control section 80 further calculates energy balance between the electric power generation amount and the discharge amount with use of variation prediction, and calculates the timing of switching between various modes relating to electric power generation and discharge with use of the energy balance thereby obtained. The electric power generation control circuit 81 of the control section 80 further executes switching between various modes according to the timing of switching obtained by calculation. For example, in a case where the tuning mode is executed, the control section 80 outputs a signal that gives an instruction to execute the tuning mode from the electric power generation control circuit 81 to the electric power generation section 10. For example, in a case where the electric power generation mode is executed, the control section 80 does not do anything special. For example, in a case where the sleep mode is executed, the control section 80 outputs a signal to stop driving of the drive section 40 from the electric power generation control circuit 81 to the drive control circuit 31. When the drive control circuit 31 receives, from the electric power generation control circuit 81, the signal to stop driving of the drive section 40, the drive control circuit 31 outputs, to the drive section 40, the signal to stop driving of the drive section 40.

It is to be noted that, for example, as illustrated in FIG. 47, the control section 80 may detect the output of the power storage section 22 or the output of the step-up/step-down circuit 23 as the above-described physical quantity. Moreover, for example, as illustrated in FIG. 48, the control section 80 may detect the output of the sensor section 60 as the above-described physical quantity.

Application Example 3

FIG. 49 illustrates still another application example of the electric power generation control system 100. The electric power generation control system 100 is applicable to an electronic apparatus 3 including an electric power generation system and an electric power storage system.

For example, as illustrated in FIG. 49, the electronic apparatus 3 may include the electric power generation section 10, the power supply section 70, a control section 90, the drive section 40, and the load 50. The control section 90 is configured to control the drive section 40 in this application example. For example, as illustrated in FIG. 50, the control section 90 may include a drive control circuit 91 configured to control the drive section 40, an electric power generation control circuit 92 configured to control the drive section 40 through the drive control circuit 91, and the database 33 holding the variation log 33A corresponding to the variation log 116A. The electric power generation control circuit 92 of the control section 90 detects the output of the electric power generation section 10 as the above-described physical quantity, recognizes a variation pattern from the detected physical quantity, and predicts future variation, based on the variation log 33A corresponding to the variation log 116A and the variation pattern obtained from the newly obtained physical quantity. The electric power generation control circuit 92 of the control section 90 further calculates energy balance between the electric power generation amount and the discharge amount with use of variation prediction, and calculates the timing of switching between various modes relating to electric power generation and discharge with use of the energy balance thereby obtained. The electric power generation control circuit 92 of the control section 90 further executes switching between various modes according to the timing of switching obtained by calculation. For example, in a case where the assistance mode (the mode B) is executed, the control section 90 outputs a signal (an on signal) that gives an instruction to execute the mode B from the electric power generation control circuit 92 to the drive control circuit 91. When the drive control circuit 91 receives the signal (the on signal) that gives the instruction to execute the mode B from the electric power generation control circuit 92, the drive control circuit 91 outputs the signal that gives the instruction to execute the mode B to the drive section 40. For example, in a case where the electric power generation mode is executed, the control section 90 does not do anything special. For example, in a case where the sleep mode is executed, the control section 90 outputs a signal to stop driving of the drive section 40 from the electric power generation control circuit 92 to the drive control circuit 91. When the drive control circuit 91 receives, from the electric power generation control circuit 92, the signal to stop driving of the drive section 40, the drive control circuit 91 outputs, to the drive section 40, the signal to stop driving of the drive section 40.

It is to be noted that, for example, as illustrated in FIG. 51, the control section 90 may detect the output of the power storage section 22 or the output of the step-up/step-down circuit 23 as the above-described physical quantity. Moreover, for example, as illustrated in FIG. 52, the control section 90 may detect the output of the sensor section 60 as the above-described physical quantity.

Although the embodiment of the present technology is described referring to the embodiment and the application examples, the present technology is not limited to the above-described embodiment and the like, and may be variously modified.

For example, in the above-described embodiment and the like, the assistance mode is a mode illustrated in FIG. 3A or 3B; however, for example, as illustrated in FIG. 53A, the assistance mode may be a mode of performing reproduction of sleep-inducing music. Moreover, for example, as illustrated in FIG. 53B, the assistance mode may be a mode of performing reproduction of music that matches a user's feeling. The reproduction of the music that matches the user's feeling may indicate, for example, reproduction of music to heal the user's feeling when the user feels depressed.

In a case where the electric power generation control circuit 32, 81, or 92 (or the arithmetic circuit 32A into which the electric power generation control program 32B is loaded) detects time for the user to sleep, the electric power generation control circuit 32, 81, or 92 (or the arithmetic circuit 32A) outputs, to the drive control circuit 31 or 91, an instruction to reproduce sleep-inducing music for the user. When the drive control circuit 31 or 91 receives a signal that gives the instruction to reproduce sleep-inducing music for the user from the electric power generation control circuit 32, 81, or 92 (or the arithmetic circuit 32A into which the electric power generation control program 32B is loaded), the drive control circuit 31 or 91 outputs data of such music to the drive section 40.

When the electric power generation control circuit 32, 81, or 92 (or the arithmetic circuit 32A into which the electric power generation control program 32B is loaded) detects that the user feels depressed, the electric power generation control circuit 32, 81, or 92 (or the arithmetic circuit 32A) outputs an instruction to reproduce music to heal the user's feeling to the drive control circuit 31 or 91. When the drive control circuit 31 or 91 receives a signal that gives the instruction to reproduce music to heal the user's feeling from the electric power generation control circuit 32, 81, or 92 (or the arithmetic circuit 32A into which the electric power generation control program 32B is loaded), the drive control circuit 31 or 91 outputs data of such music to the drive section 40.

Moreover, for example, the embodiment of the present technology may have the following configurations.

(1) An electric power generation control system including:

a variation prediction section configured to predict future variation, based on a variation log including a plurality of variation patterns obtained from past physical quantities and a variation pattern obtained from a newly obtained physical quantity;

a balance calculation section configured to calculate energy balance between a electric power generation amount and a discharge amount with use of variation prediction in the variation prediction section; and a switching timing calculation section configured to calculate a timing of switching between various modes relating to electric power generation and discharge with use of the energy balance calculated by the balance calculation section.

(2) The electric power generation control system according to (1), further including:

a physical quantity detection section configured to detect a physical quantity; and a variation pattern recognition section configured to recognize the variation pattern from the detected physical quantity.

(3) The electric power generation control system according to (2), in which the variation pattern recognition section recognizes, as the variation pattern, a behavior pattern of a user of the electric power generation control system, a moving pattern of a moving body mounted in the electric power generation control system, or a variation pattern of an ambient environment of the electric power generation control system.

(4) The electric power generation control system according to any one of (1) to (3), in which the switching timing calculation section calculates the timing of switching to have higher energy balance than energy balance calculated by the balance calculation section.

(5) The electric power generation control system according to any one of (1) to (4), further including a database holding the variation log.

(6) The electric power generation control system according to any one of (1) to (5), further including a detection timing setting section configured to set a timing of detecting a physical quantity.

(7) The electric power generation control system according to any one of (1) to (5), in which the various modes include an electric power generation mode, an assistance mode, and a sleep modes, the assistance mode in which energy is supplied from a electric power storage system to an electric power generation system, the sleep mode in which driving of a load is stopped.

(8) The electric power generation control system according to any one of (1) to (5), in which the various modes include an electric power generation mode, an assistance mode, and a sleep modes, the assistance mode in which music inducing an increase in an electric power generation amount is reproduced, the sleep mode in which driving of a load is stopped.

(9) The electric power generation control system according to any one of (1) to (5), in which the various modes include an electric power generation mode, a tuning mode, and a sleep modes, the tuning mode in which an electric power generation system is tuned to increase an electric power generation amount, the sleep mode in which driving of a load is stopped.

(10) The electric power generation control system according to any one of (1) to (5), in which the various modes include an electric power generation mode, an assistance mode, a tuning mode, and a sleep mode, the assistance mode in which energy is supplied from an electric power storage system to an electric power generation system, the tuning mode in which the electric power generation system is tuned to increase an electric power generation amount, the sleep mode in which driving of a load is stopped.

(11) An electric power generation control program allowing, when executed by a computer, the computer to implement a method, the method including:

a variation prediction step in which future variation is predicted, based on a variation log including a plurality of variation patterns obtained from past physical quantities and a variation pattern obtained from a newly obtained physical quantity;

a balance calculation step in which energy balance between an electric power generation amount and a discharge amount is calculated with use of the variation prediction in the variation prediction section; and a switching timing calculation step in which a timing of switching between various modes relating to electric power generation and discharge is calculated with use of the energy balance calculated in the balance calculation step.

(12) The electric power generation control program according to (11), in which the method further includes:

a physical quantity detection step in which a physical quantity is detected; and a variation pattern recognition step in which the variation pattern is recognized from the detected physical quantity.

(13) The electric power generation control program according to (12), in which, in the variation pattern recognition step, a behavior pattern of a user of the electric power generation control system, a moving pattern of a moving body mounted in the electric power generation control system, or a variation pattern of an ambient environment of the electric power generation control system is recognized as the variation pattern.

(14) The electric power generation control system according to any one of (11) to (13), in which, in the switching timing calculation step, the timing of switching is calculated to have higher energy balance than energy balance calculated in the balance calculation step.

(15) The electric power generation control system according to any one of (11) to (14), in which the method further including a detection timing setting step in which a timing of detecting a physical quantity is set.

(16) An electronic apparatus including:

an electric power generation section configured to generate electric power;

a power supply section configured to accumulate electrical energy generated by the electric power generation section and output the accumulated voltage or a voltage corresponding the accumulated voltage;

a drive section configured to drive a load;

a drive control section configured to control the drive section; and an electric power generation control section configured to control the electric power generation section, the power supply section, or the drive control section, the electric power generation control section including:

a variation prediction section configured to predict future variation, based on a variation log including a plurality of variation patterns obtained from past physical quantities and a variation pattern obtained from a newly obtained physical quantity;

a balance calculation section configured to calculate energy balance between an electric power generation amount and a discharge amount with use of variation prediction in the variation prediction section;

a switching timing calculation section configured to calculate a timing of switching between various modes relating to electric power generation and discharge with use of the energy balance calculated by the balance calculation section; and a mode control section configured to execute switching between various modes according to the timing of switching formed by the switching timing calculation section.

The present disclosure contains subject matter related to that disclosed in Japanese Priority Patent Application No. 2011-238214 filed in the Japan Patent Office on Oct. 31, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An electronic device comprising:

electric power generation control circuitry configured to:
  detect a physical quantity indicating a supply amount of electrical power stored in an electric power storage system of the electronic device;
  predict future variation in the supply amount of electrical power stored in the electric power storage system, wherein the prediction is based on a variation log including a plurality of variation patterns based on past physical quantities and a variation pattern based on the detected physical quantity;
  predict future variation in a discharge of electrical power from the electric power storage system, wherein the prediction is determined based on the variation log including the plurality of variation patterns based on the past physical quantities and the variation pattern based on the detected physical quantity;
  calculate an expected electric power generation amount based on the predicted future variation in the supply amount of electrical power stored in the electric power storage system;
  calculate an expected electric power discharge amount based on the predicted future variation in the discharge of electrical power from the electric power storage system;
  calculate an energy balance between the expected electric power generation amount and the expected electric power discharge amount; and
  compute, using the calculated energy balance, a plurality of time intervals for switching between a plurality of modes relating to electric power generation, electric power storage, and electric power discharge.

2. The electronic device according to claim 1, further comprising:
   a physical quantity detection circuit configured to detect the physical quantity; and
   a variation pattern recognition circuit configured to recognize the variation pattern based on the detected physical quantity.

3. The electronic device according to claim 2, wherein the variation pattern recognition circuit is configured to recognize, as the variation pattern, a behavior pattern of a user of the electronic device, a moving pattern of a moving body mounted in the electronic device, or a variation pattern of an ambient environment of the electronic device.

4. The electronic device according to claim 1, wherein the plurality of time intervals for switching are calculated to have higher energy balance than the energy balance calculated based on the expected electric power generation amount and the expected electric power discharge amount.

5. The electronic device according to claim 1, further comprising a database holding the variation log.

6. The electronic device according to claim 1, further comprising a detection timing setting circuit configured to set a timing of detecting the physical quantity.

7. The electronic device according to claim 1, wherein the plurality of modes includes an electric power generation mode, an assistance mode, and a sleep mode, wherein in the assistance mode energy is supplied from the electric power storage system to an electric power generation system, and further wherein in the sleep mode driving of a load is stopped.

8. The electronic device according to claim 1, wherein the plurality of modes includes an electric power generation mode, an assistance mode, and a sleep mode, wherein in the assistance mode music inducing an increase in an electric power generation amount is reproduced, and further wherein in the sleep mode driving of a load is stopped.

9. The electronic device according to claim 1, wherein the plurality of modes includes an electric power generation mode, a tuning mode, and a sleep mode, wherein in the tuning mode an electric power generation system is tuned to increase an electric power generation amount, and further wherein in the sleep mode driving of a load is stopped.

10. The electronic device according to claim 1, wherein the plurality of modes includes an electric power generation mode, an assistance mode, a tuning mode, and a sleep mode, wherein in the assistance mode energy is supplied from the electric power storage system to an electric power generation system, and further wherein in the tuning mode the electric power generation system is tuned to increase an electric power generation amount, and further wherein in the sleep mode driving of a load is stopped.

11. An electric power generation control program allowing, when executed by a computer, the computer to implement a method, the method comprising:
   detecting a physical quantity indicating a supply amount of electrical power stored in an electric power storage system of an electronic device;
   predicting future variation in the supply amount of electrical power stored in the electric power storage system, wherein future variation is predicted based on a variation log including a plurality of variation patterns based on past physical quantities and a variation pattern based on the detected physical quantity;
   predicting future variation in a discharge of electrical power from the electric power storage system, wherein the prediction is determined based on the variation log including the plurality of variation patterns based on the past physical quantities and the variation pattern based on the detected physical quantity;
   calculating an expected electric power generation amount based on the predicted future variation in the supply amount of electrical power stored in the electric power storage system;
   calculating an expected electric power discharge amount based on the predicted future variation in the discharge of electrical power from the electric power storage system;
   calculating an energy balance between the expected electric power generation amount and the expected electric power discharge amount; and
   computing, using the calculated energy balance, a plurality of time intervals for switching between a plurality of modes relating to electric power generation, electric power storage, and electric power discharge.

12. The electric power generation control program according to claim 11, wherein the method further comprises:
   recognizing the variation pattern from the detected physical quantity.

13. The electric power generation control program according to claim 12, wherein recognizing the variation pattern comprises recognizing, as the behavior pattern, a behavior pattern of a user of the electronic device, a moving pattern of a moving body mounted in the electronic device, or a variation pattern of an ambient environment of the electronic device.

14. The electric power generation control program according to claim 11, wherein the plurality of time intervals for switching are computed to have higher energy balance than the energy balance calculated based on the expected electric power generation amount and the expected electric power discharge amount.

15. The electric power generation control program according to claim 11, wherein the method further comprises setting a timing for detecting the physical quantity.

16. An electronic apparatus comprising:
   an electric power generation circuit configured to generate electric power;
   an electric power storage system configured to accumulate electrical power generated by the electric power generation circuit and discharge the accumulated electrical power or a voltage corresponding to the accumulated electrical power;
   a drive circuit configured to drive a load;
   a drive control circuit configured to control the drive circuit; and
   electric power generation control circuitry configured to control the electric power generation circuit, the electric power storage system, or the drive control circuit, the electric power generation control circuitry being further configured to:
   detect a physical quantity indicating a supply amount of electrical power stored in the electric power storage system of the electronic device;
   predict future variation in the supply amount of electrical power stored in the electric power storage system, wherein the prediction is based on a variation log including a plurality of variation patterns based on past physical quantities and a variation pattern based on the detected physical quantity;

predict future variation in a discharge of electrical power from the electric power storage system, wherein the prediction is determined based on the variation log including the plurality of variation patterns based on the past physical quantities and the variation pattern based on the detected physical quantity;

calculate an expected electric power generation amount based on the predicted future variation in the supply amount of electrical power stored in the electric power storage system;

calculate an expected electric power discharge amount based on the predicted future variation in the discharge of electrical power from the electric power storage system;

calculate an energy balance between the expected electric power generation amount and the expected electric power discharge amount;

compute, using the calculated energy balance, a plurality of time intervals for switching between a plurality of modes relating to electric power generation, electric power storage, and electric power discharge; and switch the electric power storage system between the plurality of modes according to the plurality of time intervals.

\* \* \* \* \*